United States Patent [19]

Schotz et al.

[11] Patent Number: 5,299,264

[45] Date of Patent: Mar. 29, 1994

[54] SYSTEM FOR SHORT-RANGE TRANSMISSION OF SIGNALS OVER THE AIR USING A HIGH FREQUENCY CARRIER

[75] Inventors: Larry Schotz, Mequon; Robert T. Buczkiewicz, Germantown; John A. Lofgren, Milwaukee, all of Wis.

[73] Assignee: L. S. Research, Inc., Cedarburg, Wis.

[21] Appl. No.: 748,267

[22] Filed: Aug. 21, 1991

[51] Int. Cl.$^5$ ............................................... H04H 5/00
[52] U.S. Cl. ........................................... 381/14; 381/2; 370/14; 370/50; 370/120; 370/123
[58] Field of Search ............... 381/2, 14; 370/14, 120, 370/123; 370/50

[56] References Cited

U.S. PATENT DOCUMENTS

| | | | |
|---|---|---|---|
| 3,256,389 | 6/1966 | Ehrich | 370/50 |
| 3,471,646 | 10/1969 | Magnuski et al. | 370/50 |
| 3,787,772 | 1/1974 | Sedin | 325/171 |
| 4,079,203 | 3/1978 | Dragoo | 370/11 |
| 4,586,081 | 4/1986 | St. Arnaud et al. | 381/3 |
| 4,704,715 | 11/1987 | Shibagaki | 375/50 |
| 4,710,970 | 12/1987 | Wu et al. | 455/113 |
| 4,829,570 | 5/1989 | Schotz . | |
| 4,864,636 | 9/1989 | Brunius . | |
| 4,922,483 | 5/1990 | Kobayashi | 370/50 |
| 4,951,006 | 8/1990 | Cohen | 455/129 |
| 5,046,132 | 9/1991 | Trefney . | |
| 5,077,835 | 12/1991 | Margairaz et al. . | |
| 5,106,826 | 4/1992 | Alford et al. . | |
| 5,155,590 | 12/1992 | Beyers, II et al. | 455/2.1 |

OTHER PUBLICATIONS

Radio Electronics, Editorial-Some happenings at the FCC Jan. 1988, Brian C. Fenton.
Spec-Com-The Radio Amateur's Journal for Specialized Communications Sep./Oct. 1985.
CMOS Analog Multiplexers/Demultiplexers, CD4051B, CD4052B, CD4053B Types (RCA).
CMOS Ripple-Carry Binary Counter/Dividers, CD4020B, CD4024B, CD4040B Types (RCA).
(Coaxial Ceramic Resonator Data Sheet) Murata Products for Mobile Telecommunications E-AMPS.
NEC-General Purpose Dual-Gate GaAs MESFET, NE25137, NE25139.
NEC-NPN Silicon High Frequency Transistor, NE856 Series.
VCO Nonadjusting PLL FM MPX Demodulator with SNC, HCC Functions, Pilot Canceler for Car Stereos, LA3430 (Sanyo).
Monolithic Linear Integrated Circuit FM IF System, LA1235 (Sanyo).
Coaxial Ceramic Resonators for UHF and Microwaves, Gundolf Kuchler (Siemens).

*Primary Examiner*—John K. Peng
*Assistant Examiner*—Edward Lefkowitz
*Attorney, Agent, or Firm*—Caesar, Rivise, Bernstein, Cohen & Pokotilow, Ltd.

[57] ABSTRACT

A system is provided which transmits either analog or digital data signals over the air. The system includes including a transmitter and a receiver. The transmitter and receiver are arranged to transmit signals using a carrier signal having a high frequency such as in the range of 902-928 MHz. The transmitter and receiver are configured to provide for the transmission of two channels of stereophonic signals while maintaining high signal-to-noise ratios, good frequency response, and low distortion. To provide for the proper transmission of signals between transmitter 10 and receiver 12, these devices include oscillating circuits having ceramic resonators which provide a base frequency which is readily modulated to facilitate proper transmission of either analog or digital signals between the transmitter and receiver. To further improve the transmission capability between the transmitter and receiver, the transmitter and receiver both include substantial buffering, isolation and shielding between selected circuit components to prevent unwanted areas of frequency modulation within the transmitter and receiver.

26 Claims, 16 Drawing Sheets

SYSTEM FOR SHORT-RANGE TRANSMISSION OF SIGNALS OVER THE AIR USING A HIGH FREQUENCY CARRIER

FIELD OF THE INVENTION

The present invention generally relates to the transmission of information such as analog or digital data signals over the air. More particularly, the present invention relates to short-range transmission of information over the air via the use of a high frequency carrier. The system may be used for such applications as transmitting signals to a high-fidelity speaker using a transmitter and receiver where the transmitter and receiver may be separated by a distance in the range of 10 to 300 feet.

BACKGROUND OF THE INVENTION

A number of systems have been developed to avoid wiring stereo speakers directly to the source of signals used to drive the speakers, e.g., phonographs, tape decks, CD ROM players, or AM/FM tuners. By way of example, U.S. Pat. No. 4,829,570, issued to Larry Schotz on May 9, 1991, discloses a system of this type. This system, while not requiring direct wiring between the source of signals and the speaker, transmits the signals over the A.C. electrical conductors of the building in which the system is located. The signals transmitted in this manner are subject to certain undesirable effects, such as filtering for computer systems. This type of filtering may eliminate or degrade the signals intended for transmission to the speakers.

An alternative to using any form of wiring between a speaker and the source of signals for driving the speaker is to transmit the signals over the air via electromagnetic waves such as radio waves. This type of system requires the use of a transmitter for transmitting the signals, a receiver for receiving the signals at the speaker, and a power amplifier for amplifying the signals at the speakers to properly drive the speakers. The drawback with this type of system is that the FCC strictly regulates the frequencies at which information may be transmitted over the air without the requirement of an appropriate license. Additionally, the number of frequencies at which transmission may occur is limited. Currently, the frequency bands available for transmitting information using low power transmission without a license are at high frequency ranges. For example, the FCC currently allows the use of low power transmission in the range of 902 to 928 MHz, 2.4 to 2.483 GHz and 5.725 to 5.875 GHz.

Even though frequency bands are now available for the low power transmission of information at relatively high frequencies (over 900 MHz), current transmitter and receiver arrangements for transmitting at lower frequencies are not readily modifiable for the purpose of transmitting at relatively high frequencies such as over 900 MHz. Attempts to modify existing transmitter and receiver arrangements to transmit information have resulted in systems capable of transmitting information in a relatively crude manner. More specifically, the signal-to-noise ratio for signals transmitted using these modified systems is low, the frequency response of such systems is poor, the distortion is typically unacceptable, and it is difficult if not impossible to transmit multiple channels simultaneously. Additionally, microphonics is a problem when a receiver is built into a speaker to which it is providing signals. More specifically, conventional inductive loops, which determine the frequency of the receiver's local oscillator, are subject to the vibrations of the speaker. These vibrations may adversely modulate the frequency of the local oscillator.

Wireless speaker systems are desirable, since wiring is not required between the speakers and source of signals for driving the speakers; however, an arrangement of this type is not practical if the quality of the information signal driving the speaker is poor. Stereo speaker applications require high signal-to-noise ratios, good frequency response, low distortion, and stereo capability (simultaneous transmission of two channels of information) to be practical. A wireless speaker system will not be a replacement for a system using wires unless the quality of information signals provided to drive the speakers results in a sound at the speakers comparable with the sound at similar speakers in a system using wires.

Accordingly, the need exists for a system capable of transmitting and receiving signals over the air using a high frequency carrier and also maintaining the quality of the signals.

SUMMARY OF THE INVENTION

The present invention provides for a transmitter and receiver used to transmit at least two transmitted signals carried by electromagnetic waves. The transmitter includes means for multiplexing the transmitted signals to produce a multiplexed signal; means, including a first ceramic resonator, for producing a carrier signal having a carrier frequency determined by the first ceramic resonator; means for modulating the carrier frequency based upon the multiplexed signal to produce a first electric signal; and means for radiating electromagnetic waves in response to the first electric signal. The receiver includes means for converting the electromagnetic waves to a second electric signal; and means for mixing a local signal, having a local frequency, with the second electric signal to lower the frequency of the carrier signal from the second electric signal to produce a third signal. The local frequency is offset from the carrier frequency and is determined by a second ceramic resonator. The receiver also includes means for demodulating the third signal to produce a fourth signal, the multiplexed signal. The receiver also includes a means for demultiplexing the fourth signal to produce fifth and sixth signals representative of the transmitted signals.

The present invention further provides for a transmitter and receiver used to transmit first and second channel stereophonic signals carried by electromagnetic waves. The transmitter includes a multiplexer disposed to multiplex the signals to produce a composite signal; an oscillator including a first ceramic resonator disposed to produce a carrier frequency determined by the first ceramic resonator; means for modulating the carrier frequency based upon the composite signal to produce a first electric signal; and a first antenna coupled to the means for modulating to radiate electromagnetic waves in response to the first electric signal. The receiver includes a second antenna arranged to convert the electromagnetic waves to a second electric signal; a local oscillator including a second ceramic resonator disposed to produce a local signal having a local frequency offset from the carrier frequency and determined by the second ceramic resonator; a mixer coupled to the second antenna and the local oscillator to remove the carrier signal from the second electric signal to produce a third signal; a demodulator coupled to the third signal to produce a fourth signal representative of the composite signal; and a demultiplexer coupled to the demodulator. The demultiplexer demultiplexes the fourth signal to produce fifth and sixth signals representative of the first and second channel stereophonic signals, respectively.

The present invention further provides a transmitter and receiver used to transmit digital signals carried by electromagnetic waves. The transmitter includes an oscillator including a first ceramic resonator disposed to produce a carrier signal having a carrier frequency determined by a first ceramic resonator; a first varactor coupled to the oscillator to modulate the carrier signal based upon the digital signal to produce a first electric signal; and a first antenna coupled to the oscillator to radiate electromagnetic waves in response to the first electric signal. The receiver includes a second antenna arranged to convert the electromagnetic waves to a second electric signal, a local oscillator including a second ceramic resonator disposed to produce a local signal having a local frequency offset from the carrier frequency and determined by the second ceramic resonator; a second varactor coupled to the local oscillator to control the local signal; and a mixer coupled to the second antenna and the local oscillator to reduce the frequency of the carrier signal from the second electric signal to produce a third signal, a demodulator coupled to the third signal to produce a fourth signal representative of the digital signal.

DETAILED DESCRIPTION OF THE PREFERRED EMBODIMENT

The presently preferred embodiment of the invention will be described below in reference to the transmission of stereophonic audio signals (such as left-channel and right-channel signals) from a source to a destination, where the signals are transmitted over the air via frequency modulated radio waves). Examples of suitable sources include phonographs, tape decks, CD ROM players and AM/FM tuners, where the destination is typically a speaker.

While the presently preferred embodiment of the invention is described below in reference to the transmission of stereophonic audio signals which conventionally have been analog signals, the system is also usable for the transmission of digital stereophonic audio signals which may eventually replace analog audio signals for purposes of transmitting audio information. Furthermore, the system may be modified for purposes of transmitting digital data signals, without the use of data transmission wires, for such applications as transmitting digital data over short distances between computers such as personal computers. By way of example, the system may be modified for the purpose of replacing the costly wiring in a computer network system with the ability to transmit digital data signals over the air.

In general, the system includes a transmitter 10 and a receiver 12. Transmitter 10 transmits signals over the air to receiver 12 using modulated electromagnetic (EM) waves as a carrier, where the frequency of the carrier is in the range of 902-928 MHz While this frequency range has been selected for the carrier of the presently preferred embodiment, it should be understood that the circuitry of the presently preferred embodiment may be modified to operate at frequencies outside of the 902-928 MHz range, depending upon the requirements of the specific application.

Figure 1:
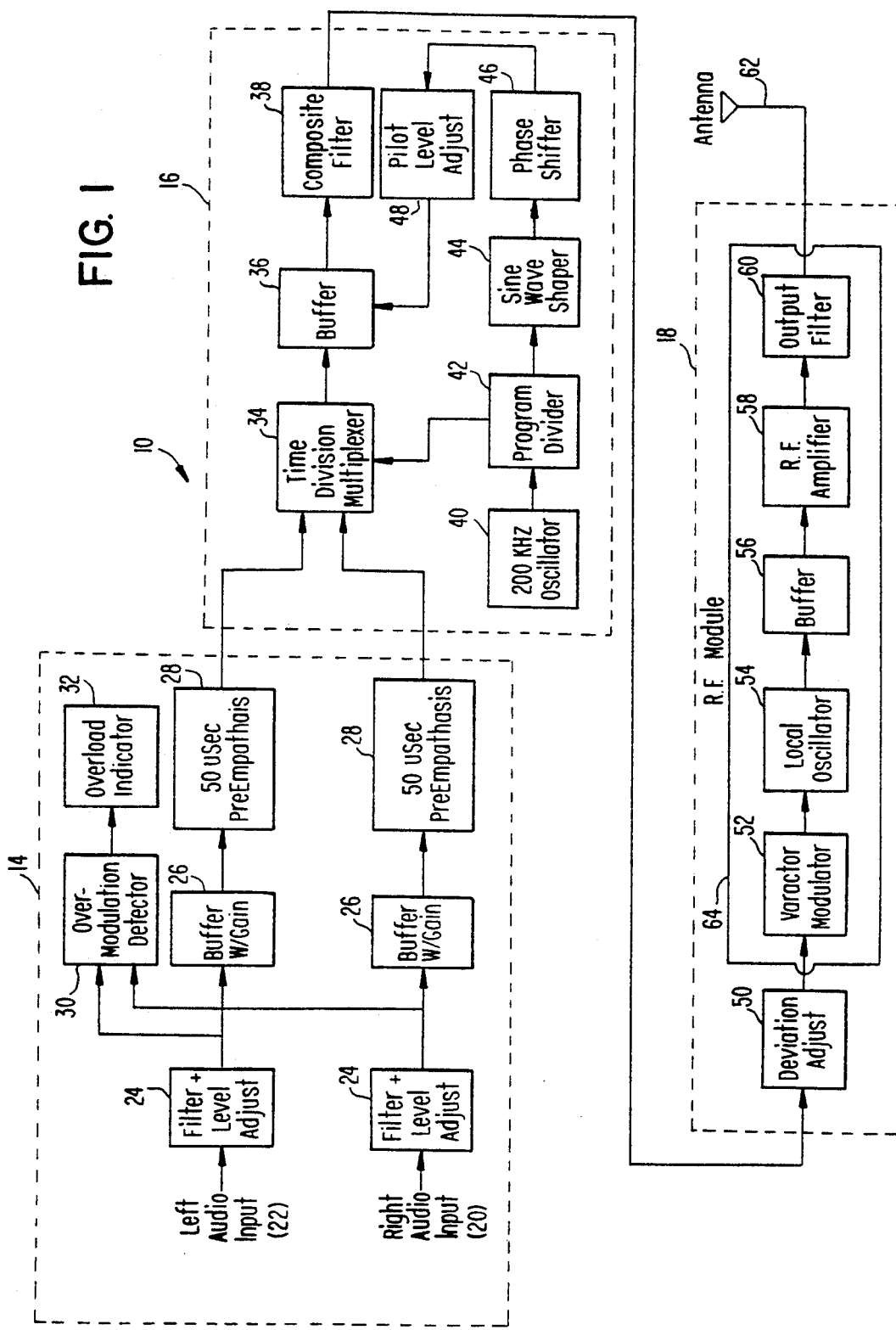
FIG. 1 is a block diagram of a portion of a transmitter using a high frequency carrier configured in accordance with an embodiment of the present invention.
Figure 3A:
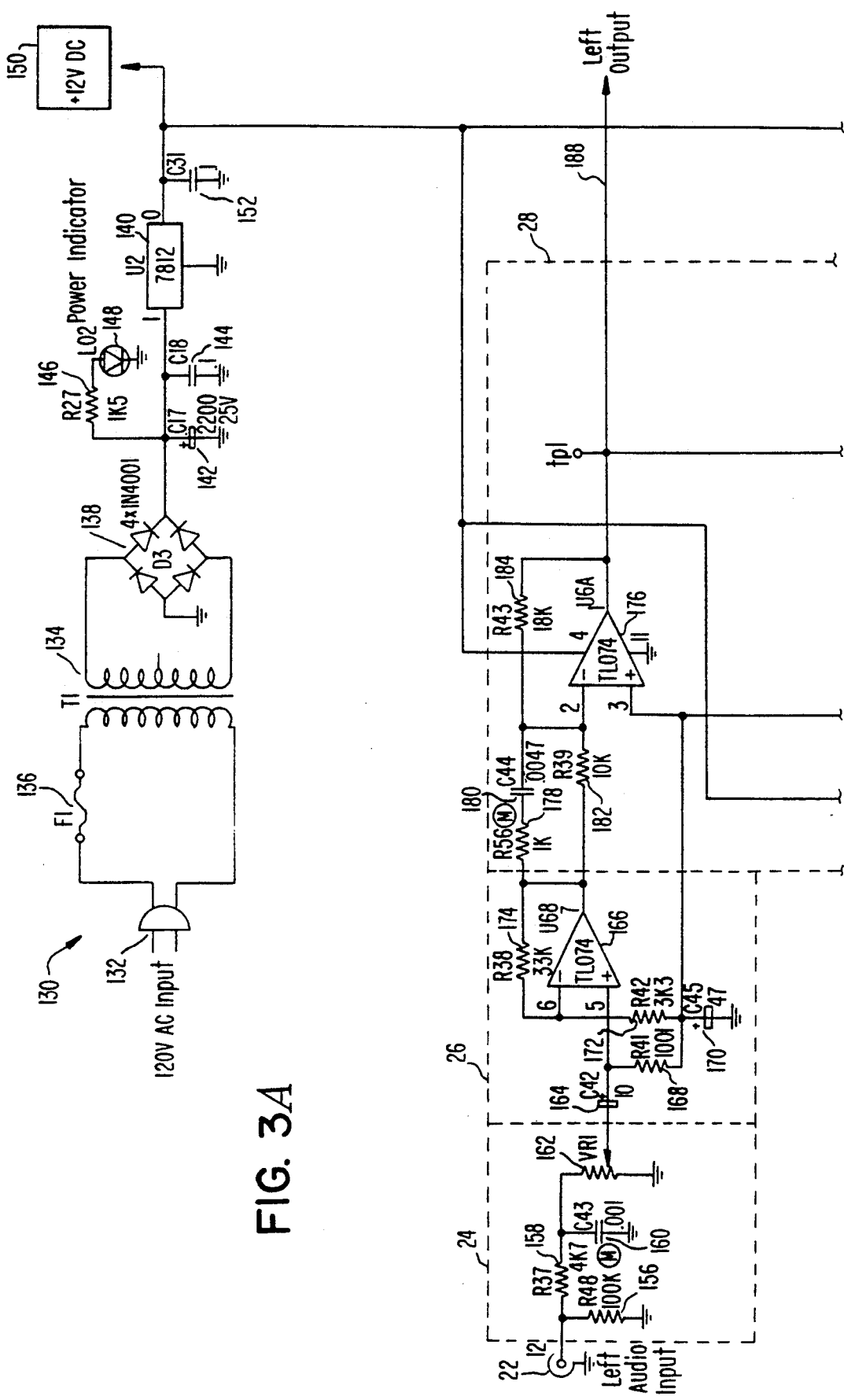
FIGS. 3A and 3B are the circuit diagram for input circuitry of the transmitter configured in accordance with an embodiment of the present invention.
Figure 3B:
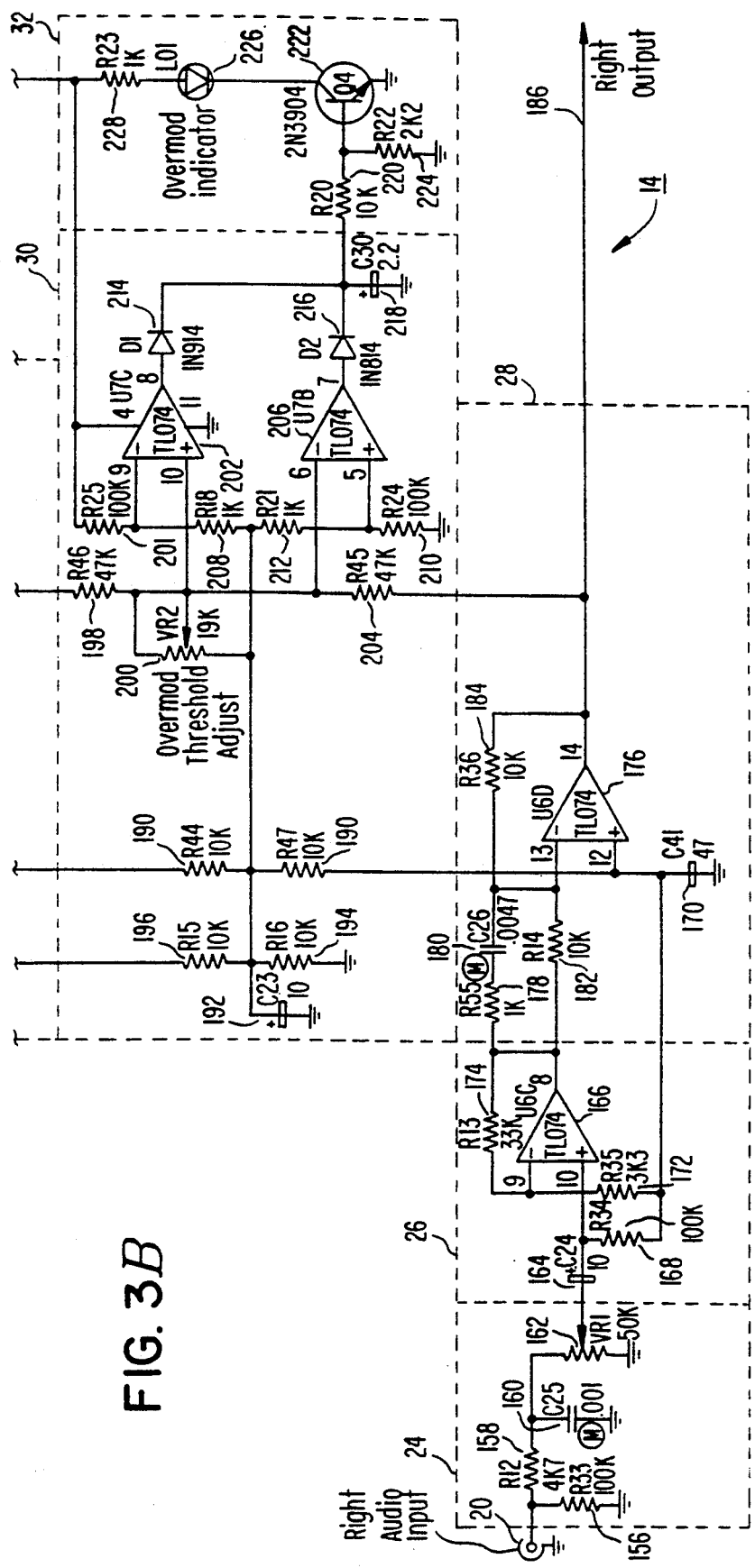
Figure 4A:
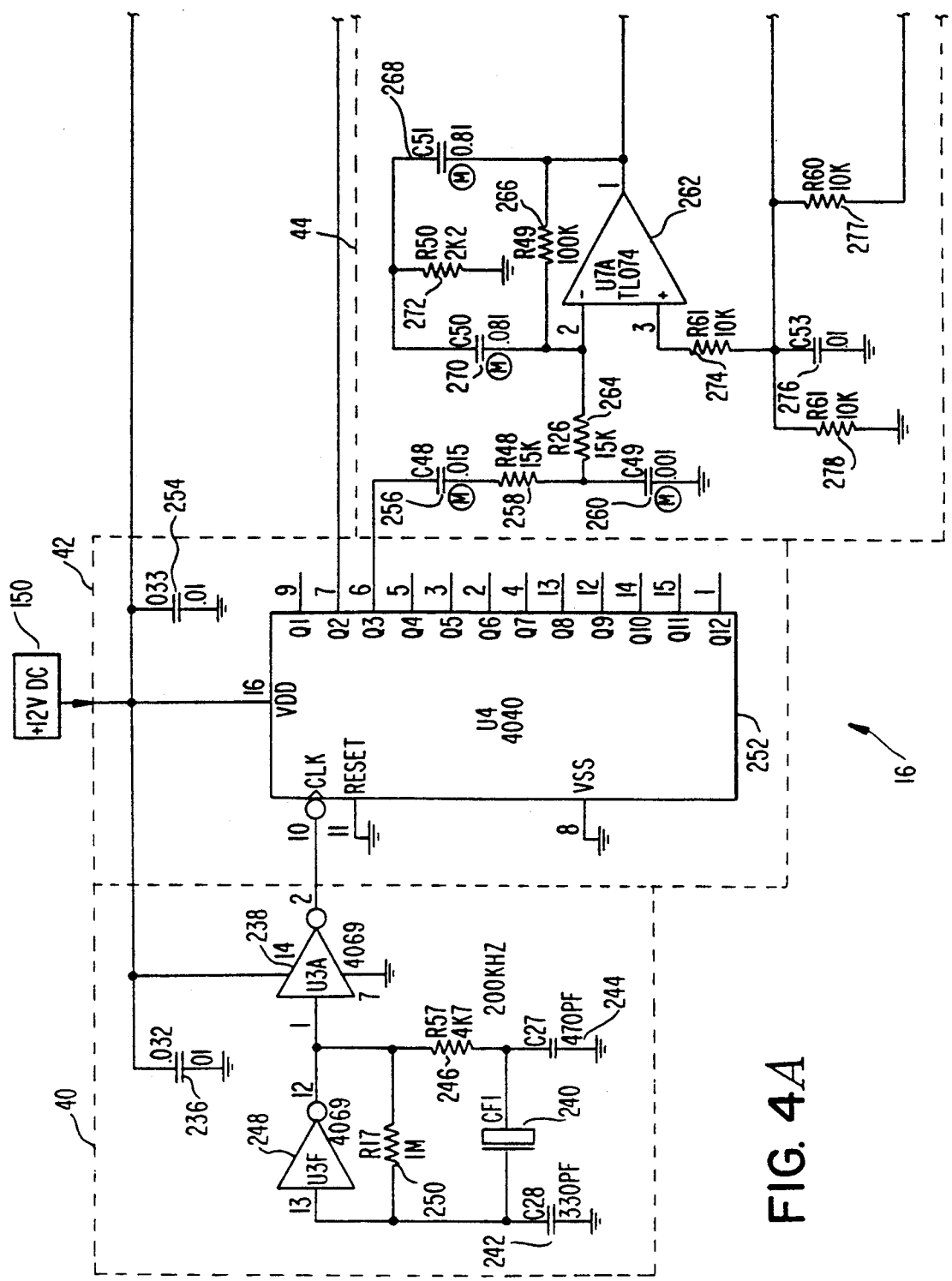
FIGS. 4A and 4B are the circuit diagram for multiplexing circuitry of the transmitter configured in accordance with an embodiment of the present invention.
Figure 4B:
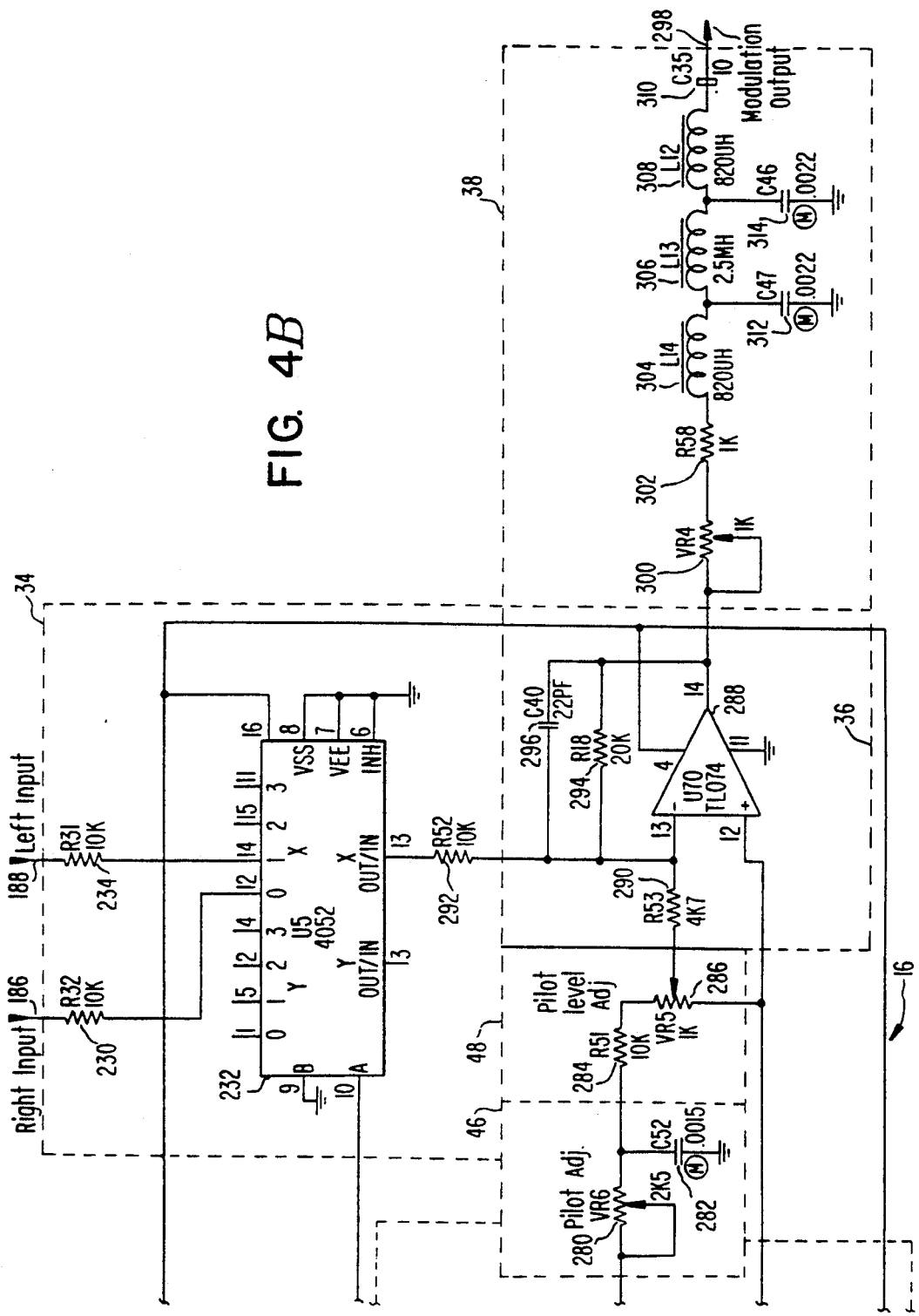
Figure 5A:
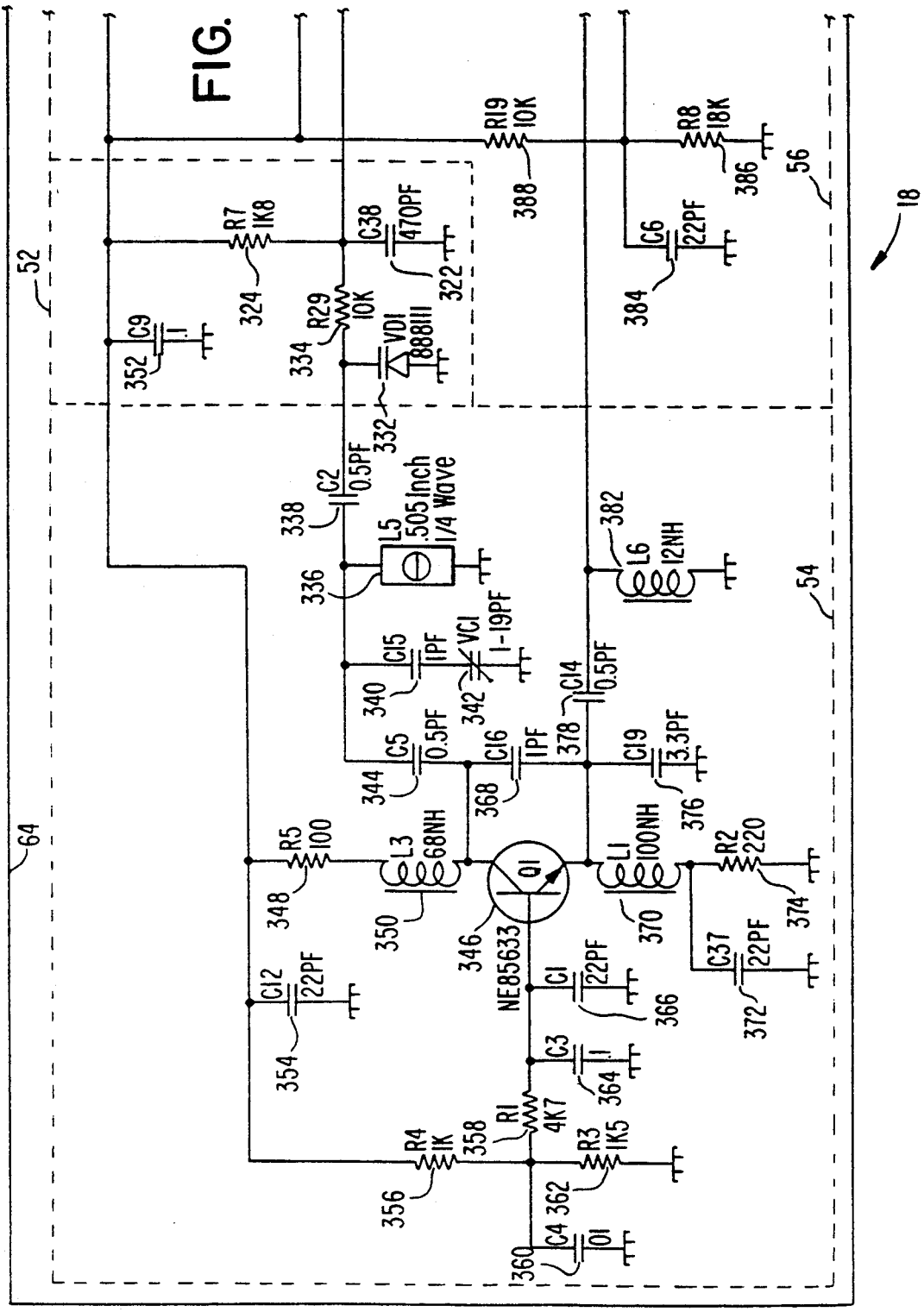
FIGS. 5A and 5B are the circuit diagram for radio frequency circuitry of the transmitter configured in accordance with an embodiment of the present invention.
Figure 5B:
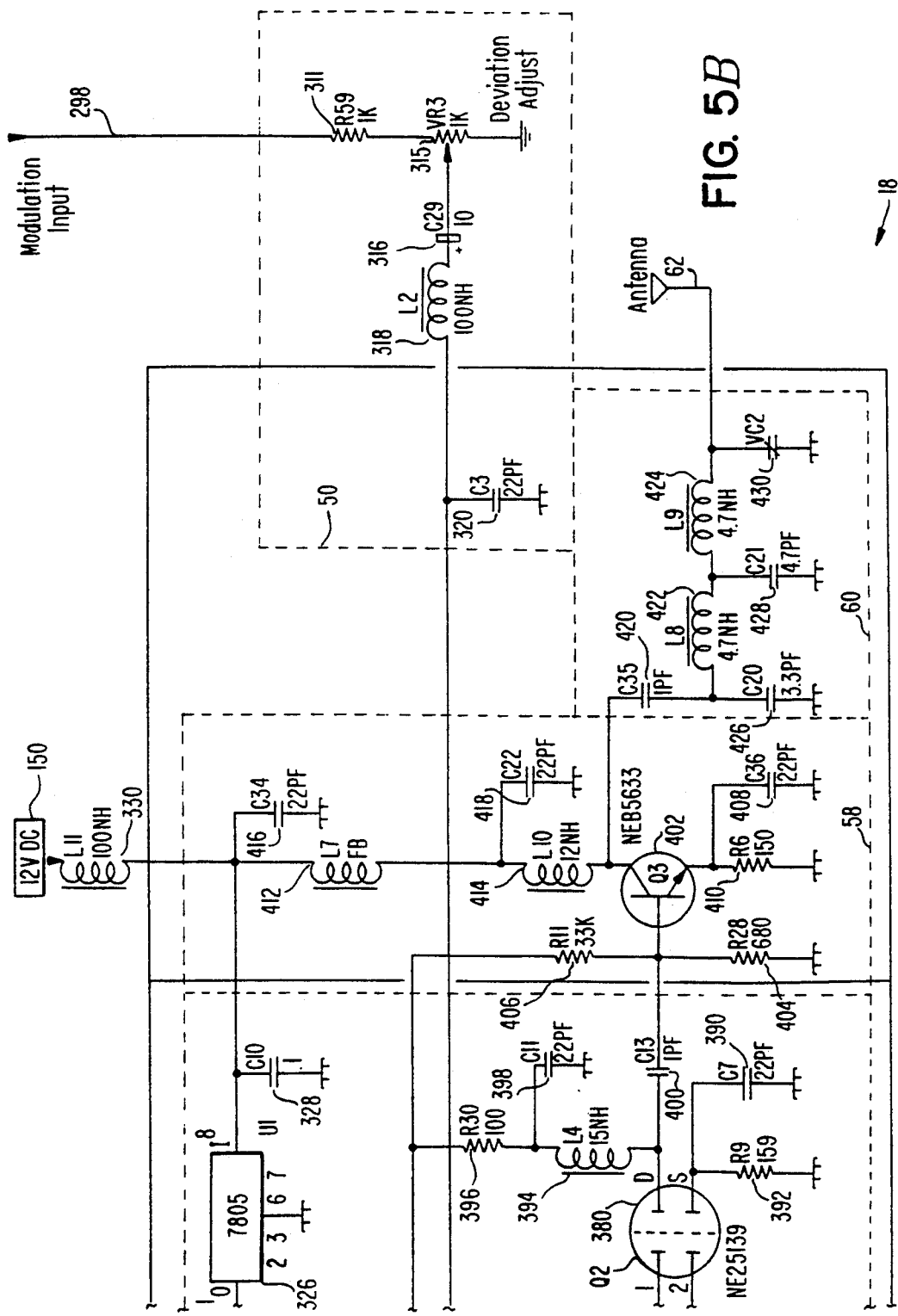

Referring to FIG. 1, transmitter 10, shown in block diagram form, includes audio input circuitry 14, multiplexing circuitry 16, and radio frequency (RF) circuitry 18 The circuitry for transmitter 10 is illustrated in FIGS. 3, 4 and 5, and described in further detail below.

Audio input circuitry 14 includes a right audio input channel 20 and a left audio input channel 22. The right and left channels of a stereophonic audio signal source are applied to channels 20 and 22, respectively, via an appropriate arrangement such as conventional plug-in jacks (not shown). Circuitry 14 also includes a filter and level adjust circuit 24, a buffering and gain circuit 26, and a pre-emphasis circuit 28 associated with each of channels 20 and 22.

The audio signals at channels 20 and 22 are first applied to filter and level adjust circuits 24. Circuits 24 include circuitry for filtering the audio signals. This circuitry provides a 20 KHz low pass filter for the audio signals. The low pass filter is used to attenuate high frequency noise, such as digital noise, present at the output jacks of such devices as low cost CD players. Circuit 24 also includes level adjust circuitry which allows the level of the audio signals to be adjusted so that different output levels of various audio sources may be accommodated. The signals from circuits 24 are applied to buffering and gain circuits 26. Buffering and gain circuits 26 buffer the output of circuit 26 from the input of pre-emphasis circuit 28, and also amplify the output of circuit 24 by a gain of, for example, 10. This amplification is provided to produce signals at the output circuits 28 having appropriate amplitudes to drive the remaining circuitry of transmitter 10.

The output signals of buffering and gain circuits 26 are applied to pre-emphasis circuits 28. Transmitter pre-emphasis is a standard technique used to improve the signal-to-noise ratio of RF transmission schemes. Typically, the noise voltage output of an FM detector, resulting from phase noise modulation, increases directly in proportion to the frequency, or at 6 dB per octave. By introducing a filter after an FM detector to attenuate at 6 dB per octave, the noise spectrum can be leveled off, thus improving the signal-to-noise ratio. Typically, a standard time constant of 50 microseconds (3.18 KHz) is used. Pre-emphasis circuit 28 compensates for the de-emphasis introduced by the filter after the FM detector. Pre-emphasis circuit 28 applies pre-emphasis to the signal from circuit 26 which matches the de-emphasis which occurs in receiver 12. Of course, other de-emphasis time constants, such as 25 and 75 microseconds, may be used for different applications.

Audio input circuitry 14 also includes an over-modulation detection circuit 30 and an overload indicator 32. The output signals from filter and level adjust circuits 24 are provided to circuit 30. When the audio signal at channel 20 or channel 22 exceeds a predetermined level, circuit 30 drives overload indicator 32 such that the user of transmitter 10 recognizes that an overload condition exists. As discussed below, overload indicator 32 may include an LED. Circuit 30 allows adjustment of transmitter 10 such that an optimal signal may be transmitted by transmitter 10 without overloading. By eliminating overload, the system will provide optimum performance and fidelity.

Multiplexing circuitry 16 includes a time division multiplexor circuit 34, a buffer circuit 36, a composite filter circuit 38, a 200 KHz oscillator circuit 40, a programmable frequency divider circuit 42, a sine wave shaping circuit 44, a phase shifting circuit 46, and a pilot frequency level adjusting circuit 48. Oscillator circuit 40 provides a stable 200 KHz reference which is a square wave. This square wave is provided to programmable frequency divider circuit 42. Frequency divider circuit 42 outputs a 50 KHz square wave to time division multiplier 34, and a 25 KHz square wave to sine wave shaping circuit 44. Sine wave shaper 44 operates as a double integrator of the 25 KHz square wave to provide a 25 KHz sine wave to phase shifting circuit 46. Phase shifting circuit 46 provides phase shifts to the 25 KHz sine wave for the purpose of compensating for any phase shifts introduced by sine wave shaping circuit 44. The 25 KHz phase adjusted sine wave is applied to pilot frequency level adjusting circuit 48, which adjusts the amplitude of the 25 KHz sine wave to produce a 25 KHz sine wave which operates as a pilot tone. The pilot tone is applied to buffer 36.

The output signals of pre-emphasis circuits 28 are applied to time division multiplexor circuit 34. Circuit 34 is clocked by the 50 KHz square wave produced by divider circuit 42. Based upon the 50 KHz square wave, multiplexor circuit 34 produces an output signal which is a time divided multiplexed signal including alternate samples of both of the outputs from pre-emphasis circuits 28 (left and right channel audio information) sampled at the 50 KHz data rate. Multiplexor 34 provides time division multiplexing to allow the audio information from the right and left channels to be transmitted simultaneously on a common carrier. The output signal of multiplexor 34 is a monophonic signal that occupies the base band of 0 to 20 KHz and a double side band suppressed carrier, or difference signal, which is modulated in the 30–70 KHz range about a carrier at 50 KHz.

The output of multiplexing circuit 34 is applied to buffer 36. Buffer 36 sums the multiplexed signal and the pilot tone. Additionally, buffer 36 may amplify the sum of the multiplex signal and the pilot tone. Buffer 36 includes low pass filtering to remove any high frequency harmonics generated during the multiplexing operation of multiplexor circuit 34. The output of buffer 36 is a composite signal including the multiplex signal and a pilot tone, and is applied to composite filter 38. Composite filter 38 is a low pass filter which converts the 50 KHz square wave to a sine wave. By removing the third and fifth harmonics of the 50 KHz square wave to convert it to a 50 KHz sine wave, the required transmission band width of the system is reduced.

Radio frequency (RF) circuitry 18 includes a deviation adjust circuit 50, a varactor modulating circuit 52, an oscillator circuit 54, an oscillator buffering circuit 56, an RF amplifying circuit 58, an output filtering circuit 60, and an antenna 62. Circuits 52, 54, 56, 58 and 60 are shielded from the other circuits of the transmitter by a grounded metallic shield 64 made of tin or other suitable shielding material. Shield 64 provide shielding which minimizes radiation.

The filtered composite signal from composite filter circuit 38 is applied to deviation adjust circuit 50. Deviation adjust circuit 50 limits the maximum amplitude of the composite signal. The output signal of adjust circuit 50 is applied to varactor modulating circuit 52 and oscillator circuit 54. Circuit 52 modulates the frequency of oscillator circuit 54. The frequency of oscillator circuit 54 is determined by a coaxial ceramic resonator operating as a ¼ wave resonant line. The output of oscillator circuit 54 is applied to oscillator buffering circuit 56. Circuit 56 provides very high reverse isolation and prevents external impedance fluctuations at antenna 62 from being reflected back and phase modulating oscillator circuit 54.

The output signal of oscillator buffering circuit 56 is applied to RF amplifying circuit 58. RF amplifying circuit 58 amplifies the output signal of circuit 56 to provide the required output power to antenna 62. The output signal of circuit 58 is applied to output filtering circuit 60. Output filtering circuit 60 is a low pass filter used to match the high output impedance of amplifying circuit 58 to the low impedance of antenna 62. Filtering circuit 60 is also used to attenuate the upper harmonics of the output signal of amplifying circuit 58. Output filtering circuit 60 is configured to be impedance matched to antenna 62. The output electric signal of filtering circuit 60 is applied to antenna 62. Antenna 62 is a ¼ wave resonant monopole antenna tuned to the desired output frequency. Antenna 62 may be permanently attached to transmitter 10. Antenna 62 radiates the modulated EM waves produced by transmitter 10 such that they may be applied to antenna 66 of receiver 12.

Figure 2:
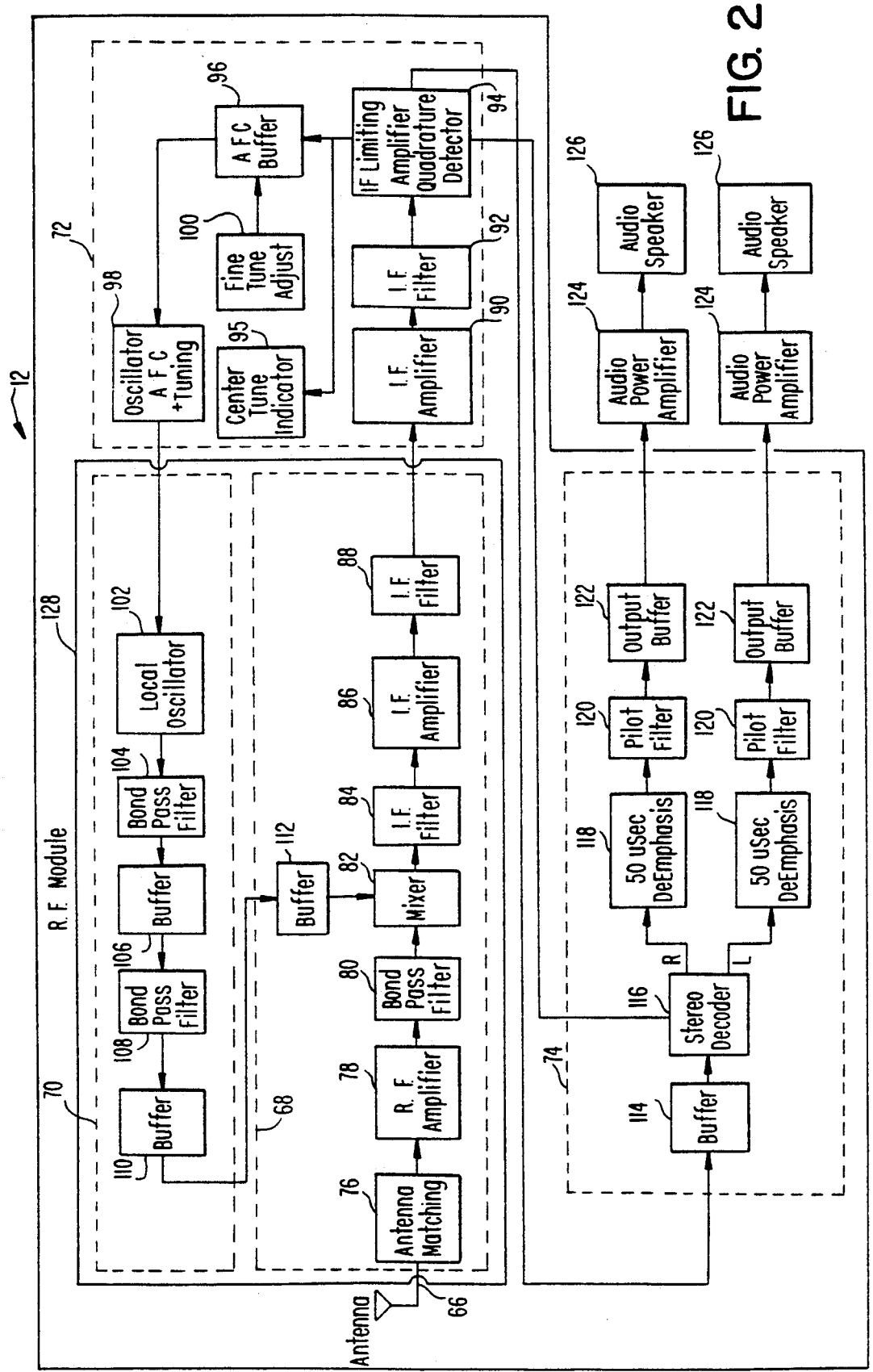
FIG. 2 is a block diagram of a portion of a high frequency receiver usable with the transmitter configured in accordance with an embodiment of the present invention.

Referring to FIG. 2, receiver 12, shown in block diagram form, includes antenna matching and intermediate frequency (IF) circuitry 68, local oscillator circuitry 70, frequency demodulation circuitry 72, and demultiplexing and audio output circuitry 74. The circuitry for receiver 12 is illustrated in FIGS. 6, 7, 8 and 9, and described in further detail below.

Antenna matching and intermediate frequency circuitry 68 includes antenna 66, antenna matching circuit 76, radio frequency (RF) amplifying circuit 78, band pass filter circuit 80, mixing circuit 82, intermediate frequency (IF) filtering circuit 84, IF amplifying circuit 86, IF filtering circuit 88, and buffering circuit 90. Antenna 66 is a ¼ wave resonant monopole antenna which is removably attached to receiver 14. By way of modification, antennas 62 and 66 may be a ¼ wave monopole omnidirectional antenna, a three-element Yagi directional antenna, a dipole loop antenna, or a ⅝ wave monopole antenna. Or course, transmission range, multipath rejection, and product packaging will all influence the configuration of an antenna used for a given application.

Antenna 66 is tuned to receive electromagnetic waves radiated by antenna 62. In response to the reception of electromagnetic waves, antenna 66 applies an electric signal to antenna matching circuit 76. Antenna matching circuit 76 matches the impedance of antenna 66 to the impedance of radio frequency amplifying circuit 78. The output signal of circuit 76 is amplified by amplifying circuit 78 which provides high gain, high reverse isolation, low noise and low input capacitance. Amplifier circuit 78 provides a high level signal for driving mixing circuit 82. The amplified output signal from circuit 78 is filtered by band pass filter circuit 80 prior to application to mixing circuit 82. Band pass filter circuit 80 filters the output of circuit 78 to select the specific signals to which receiver 12 is tuned.

The filtered and amplified signal from band pass filter circuit 80 is applied to mixing circuit 82. Additionally, the output signal (local signal) of local oscillator circuitry 70 is applied to circuit 82. Circuit 82 mixes the output signal from circuitry 70 and filter circuit 80. The output signal from circuit 82 is the difference between the signals from circuits 80 and 112. The signal from circuits 80 includes a carrier signal component (e.g., 902-928 MHz) which is offset from (typically greater than) the output signal of circuitry by an offset frequency. This frequency is preferably held at 10.7 MHz which is a typical IF frequency. This mixing process is commonly referred to as a hetrodyne process.

The IF output signal from mixing circuit 82 is applied to IF filtering circuit 84. Circuit 84 is a selective filter which filters the IF output signal to produce a filtered output signal which may be centered about an IF frequency, e.g., 10.7 MHz. The filtered output signal of circuit 84 is applied to IF amplifying circuit 86. Circuit 86 provides isolation between IF filters 84 and 88, and amplifies the filtered output signal from circuit 84 to compensate for internal losses of IF filters 84 and 88. This amplification may be in the range of 10 db. The amplified output signal of circuit 86 is applied to IF filtering circuit 88. Circuit 88 is a selective filter which further filters the amplified output signal from circuit 86. The signal from circuit 88 is centered about the IF frequency. The filtered output signal of circuit 88 is applied to frequency demodulation circuitry 72.

Frequency demodulation circuitry 72 includes an IF amplifying circuit 90, an IF filtering circuit 92, a limiting amplifier and quadrature detecting circuit 94, a center tune indicator circuit 95, an automatic frequency control (AFC) buffering circuit 96, an AFC tuning circuit 98, and a fine tuning circuit 100. The filtered output signal from IF filtering circuit 88 is applied to IF amplifying circuit 90. IF amplifying circuit 90 provides the proper impedance match between IF filter 88 and IF filter 92. Additionally, IF amplifying circuit 90 provides phase shift correction for phase shifting which may occur in IF filtering circuit 92. The output signal of circuit 90 is applied to IF filtering circuit 92. Circuit 92 filters the output signal of circuit 90 to provide a high degree of selectivity which results in improved adjacent channel rejection. Circuit 92 also improves the frequency modulation quieting curve as well as the signal-to-noise ratio by reducing the bandwidth of the IF signal.

The filtered output signal of IF filtering circuit 92 is applied to limiting amplifier and quadrature detecting circuit 94. Circuit 94 demodulates the output signal from circuit 92 to produce a composite, demodulated output signal (audio output), a received signal strength indicating signal, and an automatic frequency control (AFC) signal. The composite demodulated output signal and received signal strength indicating signal are applied to demultiplexing and audio output circuitry 74. The AFC signal is applied to indicator circuit 95 and automatic frequency control (AFC) buffering circuit 96.

Circuit 95 indicates when the receiver is properly tuned and provides feedback for the adjustment of fine tuning circuit 100. Circuit 96 amplifies the AFC signal from circuit 94 and provides isolation between AFC tuning circuit 98 and circuit 94. The output signal of circuit 96 is applied to circuit 98. Circuit 98 automatically tunes the frequency of the receiver to the frequency of the transmitter in dependence upon the output signal of circuit 96 and fine tuning circuit 100. Circuit 100 provides a manual input for purposes of fine tuning the receiver frequency to the transmitter frequency. AFC tuning circuit 98 provides an AFC voltage signal to local oscillator circuitry 70.

Local oscillator circuitry 70 includes a local oscillator circuit 102, a band pass filter circuit 104, a buffering circuit 106, a band pass filter circuit 108, and a buffering circuit 110. The AFC voltage signal from AFC tuning circuit 96 is applied to circuit 102. Circuit 102 produces a local oscillator signal having a local frequency determined by a coaxial ceramic resonator similar to that in circuit 54. The local oscillator frequency is controlled by the AFC voltage signal.

The local oscillator signal is applied to band pass filter circuit 104. Circuit 104 filters the local oscillator signal, and applies the signal to buffering circuit 106. Circuit 104 provides band pass filtering centered on the local oscillator frequency to remove harmonics and provide isolation. Buffering circuit 106 isolates circuit 106 from band pass filter circuit 108 and also amplifies the local oscillator signal to account for losses in circuit 104. By way of example, circuit 106 may provide 10 db of amplification. The output signal of circuit 106 is applied to band pass filter circuit 108. Band pass filter circuit 108 provides band pass filtering centered on the local oscillator frequency to remove harmonics and provide isolation. The output of circuit 108 is applied to buffering circuit 110. Circuit 110 provides low impedance suitable for driving buffering circuit 112. Buffering circuit 112 provides a low impedance signal to mixing circuit 82 which produces a mixed output signal, as described above.

The demodulated output signal and strength indicating signal produced by circuit 94 are applied to demultiplexing and audio output circuitry 74. Demultiplexing and audio output circuitry 74 includes a buffering circuit 114, and a stereo decoding circuit 116 which has a right channel output and a left channel output. Circuitry 74 also includes de-emphasis circuits 118, pilot filtering circuits 120, and output buffering circuits 122. One of circuits 118, 120 and 122 is associated with the right channel output, whereas the other of circuits 118, 120 and 122 is associated with the left channel output. The composite output signal from circuit 94 is provided to buffering circuit 114. Buffering circuit 114 amplifies the composite output signal and provides the correct signal level to stereo decoding circuit 116.

The amplified composite signal and strength indicating signal from circuit 95 are applied to circuit 116. Circuit 116 provides a time division demultiplexing scheme for demultiplexing the amplified composite signal. Based upon the strength indicating signal, circuit 116 provides blending of a right channel signal (right audio signal) at the right channel output and a left channel signal (left audio signal) at the left channel output for the purpose of providing noise cancellation under weak signal conditions to improve the signal-to-noise ratio. The right and left channel signals are applied to their respective de-emphasis circuits 118. De-emphasis circuits 118 provide 50 microsecond de-emphasis to compensate for the pre-emphasis emphasized signals to the respective pilot filtering circuits 120. Circuits 120 filter out the pilot signal from the de-emphasized signals. The filtered signals from circuits 120 are provided to the respective output buffering circuits 122. Output buffering circuits 122 amplify the filtered signals and provide a low impedance output. Output buffering circuits 122 may be coupled to conventional stereo jacks appropriate for a particular application.

The signals produced by output buffers 122 are of the type which are satisfactory for driving audio power amplifiers 124, which in turn drive audio speakers 126. Receiver 12, power amplifiers 124 and speakers 126 may all be housed in separate enclosures, but preferably, receiver 12, two audio power amplifiers 124, and one audio speaker 126 would be housed in one enclosure. Where receiver 12, two amplifiers 124 and one speaker 126 are housed in one enclosure, a wire would be provided from receiver 12 to the second speaker 126, which may be housed in separate enclosures.

To provide for proper electromagnetic shielding within receiver 12, a grounded shield 128 houses circuitry 68 and circuitry 70. Shield 128 minimizes radiation from circuitry 68 and 70. By way of example only, this shield may be fabricated from tin or any other appropriate shielding material. Additionally, circuitry 68 and 70 may be shielded separately.

Referring to FIGS. 3-5, FIGS. 3-5 illustrate the circuit diagrams for transmitter 10, and FIGS. 6-9 illustrate the circuit diagrams for receiver 12. At the end of the detailed descriptions of transmitter 10 and receiver 12 are Tables A and B. Table A is a listing of the circuit components for transmitter 10, and Table B is a listing of the components for receiver 12. By way of example only, the components of transmitter 10 and receiver 12 may be surface mount components mounted on their respective circuit boards.

Referring to FIG. 3, FIG. 3 is the circuit diagram for a transmitter power supply 130 and audio input circuitry 14. Power supply 130 includes a 120 volt AC plug 132 coupled to an 18 volt transformer 134 via a fuse 136. The secondary winding of transformer 134 is coupled to a full wave rectifier 138 which provides an 18 volt rectified signal to the input of a 12 volt voltage regulator 140. The input of regulator 140 is coupled to ground via parallel capacitors 142 and 144, and a resistor 146 in series with an LED 148. Capacitors 142 and 144 filter the 18 volt signal applied to regulator 140 to provide a range of filtering for the 60 Hz AC power voltage and higher frequency noise, and LED 148 provides an indication that power is being supplied to regulator 140. Regulator 140 provides a 12 volt filtered output to 12 volt supply voltage terminal 150. Terminal 150 is coupled to ground via capacitor 152 to filter noise developed by regulator 140 from the 12 volt output.

Right audio input 20 and left audio input 22 are applied to filter and level adjust circuits 24. The inputs are applied to a resistor 156 coupled to ground and a resistor 158 coupled to ground via a capacitor 160 and a potentiometer 162. The combination of resistor 156, resistor 158 and capacitor 160 provides a 20 KHz low pass filter for the signals applied at audio inputs 20 and 22. Potentiometer 162 allows the output signals from circuits 24 to be level adjusted to accommodate different output levels of various audio sources.

The signals at the taps of potentiometers 162 are applied to buffering and gain circuits 26. Each signal is applied to a capacitor 164 which is coupled to the non-inverting input of an op amp 166, which is coupled to a reference voltage (which by way of example, may be 6 volts via resistor 168. This reference voltage is also coupled to the inverting input of op amp 166 by a resistor 172 and the non-inverting input of op amp 176. Resistor 174 provides the feedback circuit to the inverting input of op amp 166. The signals from the outputs of op amps 166 are applied to pre-emphasis circuits 28. Each signal is applied to the inverting input of an op amp 176 via a series arrangement of a resistor 178 and a capacitor 180 in parallel with a resistor 182. The combination of capacitor 180 and resistor 182 provide the 50 microsecond time constant for pre-emphasis circuit 28, and resistor 178 provides a 20 KHz shelf to restrict pre-emphasis to frequencies below 20 KHz.

A resistor 184 provides feedback for op amps 176. The output of op amp 176 for the right audio signal is applied to conductor 186, and the output of op amp 176 for the left audio signal is applied to conductor 188. Op amps 166 and 176 are part of a quad package which is coupled to ground and coupled to supply voltage terminal 150 as a source of 12 volt electrical power. The non-inverting inputs of op amps 176 are coupled to ground via capacitors 170, and also coupled to a reference voltage via a resistor 190. This reference voltage is coupled to ground with a parallel arrangement of a capacitor 192 and a resistor 194. Capacitor 192 and resistor 194 are coupled to voltage terminal 150 by a resistor 196. Resistors 194 and 196 operate as a voltage divider to provide 6 volts at their connection, where capacitor 192 further filters this voltage. The terminal between capacitor 192 and resistor 194 is coupled to terminal 150 by a resistor 198.

The output signals of op amps 176 are applied to over-modulation detection circuit 30 via conductors 186 and 188. Conductor 188 is coupled to the non-inverting input of op amp 202 and the inverting input of op amp 206 by resistor 198. Potentiometer 200 couples this junction to the reference voltage point between resistors 194 and 196. Conductor 196 is coupled to this same junction by resistor 204. The inverting input of op amp 202 is coupled to the half supply point between resistors 190 by a resistor 208 and also connected to supply 150 by resistor 201. The non-inverting input of op amp 206 is coupled to ground by resistor 210 and the reference voltage between resistors 194 and 196 by a resistor 212. The outputs of the op amps are coupled to ground via diodes 214 and 216, respectively, and a capacitor 218. Potentiometer 200 provides an adjustable reference voltage which is applied to op amps 202 and 206 as discussed above.

Capacitor 218 is also coupled to overload indicator 32. More specifically, the voltage across capacitor 218 is applied to a resistor 220 which is coupled to the base of a transistor 222, and also coupled to a resistor 224 which is coupled to ground. Capacitor 218 operates as an integrator of the signals from op amps 202 and 206, since these signals are of such a frequency that LED 226 would appear as always ON without capacitor 218 present. The emitter of transistor 222 is coupled to ground, and the collector is coupled to the cathode of LED 226. The anode of LED 226 is coupled to voltage terminal 150 by resistor 228. Accordingly, the overmodulation detection circuit 30 and overload indicator 32 cooperate to light LED 226 when the signals from op amps 176 are above a predefined voltage.

Circuits 30 and 32 are configured such that LED 226 is lit up when the signals from op amps 176 exceed a predetermined unacceptable voltage. Potentiometer 200 allows the signal output levels from op amps 176 to be adjusted such that the voltage level output of the signals is lowered to a point where LED 226 is turned off. Alternatively, potentiometer 200 may be adjusted to maximize the voltage of the output signals of op amps 176 by adjusting the signal levels such that LED 226 is at the threshold of turning on.

Referring to FIG. 4, FIG. 4 is a circuit diagram for multiplexing circuitry 16. Conductors 186 and 188 are coupled to multiplexing circuitry 16 A resistor 230 couples conductor 186 to one input pin of a multiplexor 232, and resistor 234 couples conductor 188 to the other input pin of multiplexor 232 of time division multiplexor circuit 34. 200 KHz oscillator 40 includes a capacitor 236 coupled to voltage terminal 150 and ground. Capacitor 236 is also coupled to inverter 238. Inverter 248 is coupled to the input of inverter 238 and is coupled to a circuit including a ceramic resonator 240. The terminals of ceramic resonator 240 are coupled to ground by capacitors 242 and 244, respectively. One of the terminals of resonator 240 is also coupled to the output of inverter 248 by resistor 246, and the other terminal of resonator 240 is coupled to the input terminal of inverter 248. Inverter 248 with feedback resistor 250 has its output coupled to the input of inverter 238. The output of inverter 238 has a frequency of 200 KHz, and is applied to programmable frequency divider circuit 42.

The 200 KHz output signal of inverter 238 is applied to the clock input of programmable frequency divider 252. The voltage terminal of divider 252 is coupled to ground by capacitor 254 and also coupled to supply terminal 150. Divider 252 is grounded in a conventional manner. The output of divider 252 provides an output square wave having a frequency equal to the clock frequency divided by M, where is $2^n$, where n may range between 1 and 12. In particular, to obtain a particular frequency square wave from divider 252, the appropriate terminal on divider 252 is chosen. For the current application, the terminal providing a 50 KHz square wave is coupled to the clock input of multiplexor 232, and the 25 KHz output is coupled to sine wave shaping circuit 44.

The 25 KHz square wave is applied to a capacitor 256 which is coupled to ground by resistor 258 and capacitor 260. The terminal between capacitor 260 and resistor 258 is coupled to the inverting input of an op amp 262 by a resistor 264. For feedback, the output of op amp 262 is coupled to the inverting input by a resistor 266 coupled in parallel with a series arrangement of capacitors 268 and 270. The junction between capacitors 268 and 270 is coupled to ground by resistor 272. The non-inverting input of op amp 262 is coupled to a reference voltage (which, by way of example, may be 6 volts) by a resistor 274. From this resistor 278, resistor 277 provides positive voltage by coupling this point to terminal 150. The arrangement of shaping circuit 44 produces a 25 KHz sine wave at the output of operational amplifier 262.

The 25 KHz sine wave is applied to a potentiometer 280 of pilot frequency level adjusting circuit 48. Potentiometer 280 is coupled to ground by capacitor 282. The terminal between potentiometer 280 and capacitor 282 is coupled to a resistor 284, which is coupled to a potentiometer 286. Potentiometer 286 is coupled to the non-inverting input of op amp 262 by resistor 274. The combination of potentiometer 280 and capacitor 282 provide a phase delay to compensate for the phase advance introduced by circuit 44.

The center tab of potentiometer 286 is coupled to the inverting input of op amp 288 by a resistor 290, providing a means of adjusting the pilot level into op amp 288. The non-inverting input of op amp 288 is coupled to the reference voltage mentioned above along with the bottom of potentiometer 286. The output of multiplexor 232 is coupled to the inverting input of op amp 288 by a resistor 292. A resistor 294 and capacitor 296 are coupled in parallel between the output of op amp 288 and its inverting input. Op amp 288 provides isolation between adjusting circuit 48 and filter circuit 38 and amplification with a gain of approximately 4. Capacitor 296 provides filtering for the output signal at op amp 288. Op amps 202, 206, 262 and 288 are housed in a quad op amp package which is coupled to ground and is provided power via a connection to voltage terminal 150.

The output of op amp 288 is coupled to composite filter circuit 38. The composite signal applied to circuit 38 is applied to output conductor 298 by a series connection of a potentiometer 300, resistor 302, inductor 304, inductor 306, inductor 308, and capacitor 310. The terminal between inductors 304 and 306 are coupled to ground by capacitor 312, and the terminal between inductors 306 and 308 is coupled to ground by capacitor 314. The arrangement of circuit 38 provides for a filtered composite signal at conductor 298. Circuit 38 removes harmonics from the composite signal to produce a signal with a more sinusoidal shape.

Referring to FIG. 5, FIG. 5 illustrates the circuit diagram for radio frequency (RF) circuitry 18 Conductor 298 from multiplexing circuitry 16 is coupled to ground via a resistor 311 coupled in series with a potentiometer 315 of deviation adjust circuit 50. The center tab of potentiometer 315 is coupled to modulating circuit 52 with a capacitor 316 and an inductor 318. The terminal between inductor 318 and resistor 334 is coupled to ground with capacitors 320 and 322 The adjustment of potentiometer 315 limits the maximum amplitude of the composite signal. Capacitor 316 is a DC blocking capacitor, where inductor 318 and capacitors 320 and 322 form a low pass filter which minimizes RF radiation at this location in circuit 50.

Resistor 324 is coupled to the output of a voltage regulator 326. Voltage regulator 326 is a 5 volt regulator having its input coupled to ground via capacitor 328 and also coupled to voltage terminal 150 by an inductor 330. Capacitor 328 and inductor 330 provide further filtering for the input voltage to regulator 326. Regulator 326 is coupled to circuit ground in a conventional manner. The terminal between capacitor 322 and resistor 324 is coupled to the cathode of a varactor 332 (device with variable capacitance based upon voltage) by a resistor 334. The anode of varactor 332 is coupled to ground. The voltage applied at the cathode of varactor 332 varies the capacitance of varactor 332 in such a way to modulate the frequency of the signal produced by oscillating circuit 54. Capacitor 322 and resistor 324 form a low pass filter for the signal applied to varactor 332 to reduce noise.

The terminal between varactor 332 and resistor 334 is coupled to a coaxial ceramic resonator 336 by a capacitor 338. Resonator 336 is also grounded. The terminal between capacitor 338 and resonator 336 is coupled to ground via a capacitor 340 and a variable capacitor 342. The terminal between resonator 336 and capacitor 340 is coupled to the collector of transistor 346 by a capacitor 344. Variable capacitor 342 is used to adjust the oscillator frequency.

Resonator 336 provides a very stable, low-noise resonating component which operates at the fundamental frequency of circuit 54 without the requirement of frequency multiplication. Additionally, resonator 336 is substantially immune from microphonic effects such as speaker vibration of mechanical shock. Resonator 336 allows oscillating circuit 54 to operate in such a way that transmitter 10 may transmit signals to receiver 12, where high signal-to-noise ratios are obtained at receiver 12.

The collector of transistor 346 is also coupled to the output of voltage regulator 326 by a resistor 348 coupled in series with an inductor 350. The output of voltage regulator 326 is coupled to ground by a capacitor 352 to provide further filtering for the voltage output by regulator 326. It is important that the voltage applied by regulator 326 to circuits 52 and 54 is adequately filtered to prevent disturbances in the frequency produced by oscillating circuit 54. The terminal of resistor 348 coupled to the output of regulator 326 is also coupled to ground by a capacitor 354 for further filtering. The terminal between resistor 348 and capacitor 354 is coupled to the base of transistor 346 by a resistor 356 coupled in series with a resistor 358. The terminal between resistor 356 and 358 is coupled to ground by a capacitor 360 in parallel with a resistor 362. The base of transistor 346 is also coupled to ground by a capacitor 364 in parallel with a bypass capacitor 366. The emitter of transistor 346 is coupled to its collector by a capacitor 368 The emitter of transistor 346 is also coupled to ground by an inductor 370 in series with a capacitor 372 parallel with a resistor 374. The emitter of transistor 346 is also coupled to ground by a capacitor 376. Generally, transistor 346 is configured as described to form a common base Colpitts oscillator.

The above described arrangement of varactor 332, resonator 336, transistor 346 and other associated components allows for a broad and linear modulation of the resonator 336 frequency. For example, at a resonator 336 frequency of 910 MHz, this frequency may be deviated by ±120 KHz while maintaining a linearity with the voltage across varactor 332 within 0.1%.

The emitter of transistor 346 is coupled by a capacitor 378 to one gate of a dual gate transistor 380 of oscillator buffering circuit 56. The terminal between capacitor 378 and the first gate of transistor 380 is coupled to ground by inductor 382. The second gate (2) of transistor 380 is coupled to ground by a capacitor 384 coupled in parallel with a resistor 386. The second gate of transistor 380 is also coupled to the output of regulator 326 by a resistor 388. The source (S) of transistor 380 is coupled to ground by a capacitor 390 in parallel with a resistor 392. The drain of transistor 380 is coupled to the output of regulator 326 by an inductor 394 in series with a resistor 396. The terminal between inductor 394 and 396 is coupled to ground by a capacitor 398. A capacitor 400 also couples the drain (D) of transistor 380 to the base of transistor 402 of RF amplifying circuit 58. Dual gate transistor 380 operates as a low noise amplifier and provides isolation between oscillator circuit 54 and amplifying circuit 58 to avoid adverse effects upon the frequency generated by circuit 54. Capacitor 378 and inductor 382 provide impedance matching between transistors 346 and 380, and inductor 394 and capacitor 400 provide impedance matching between transistors 380 and 402.

The base of transistor 402 is coupled to ground by a resistor 404 and coupled to the output of regulator 326 by resistor 406. The emitter of transistor 402 is coupled to ground by capacitor 408 in parallel with a resistor 410. The collector of transistor 402 is coupled to voltage terminal 150 by inductor 330, an inductor 412, and an inductor 414. The terminal between inductors 330 and 412 is coupled to ground by capacitor 416, and the terminal between inductors 412 and 414 is coupled to ground by a capacitor 418. Inductors 330 and 412 provide isolation for the voltage applied to the collector of transistor 402. Inductor 414 and capacitor 420 provide impedance matching between transistor 402 output filtering circuit 60.

The collector of transistor 402 is coupled to a capacitor 420 of output filtering circuit 60. Capacitor 420 is coupled to antenna 62 by an inductor 422 in series with an inductor 424. The terminal between capacitor 420 and inductor 422 is coupled to ground by capacitor 426, the terminal between inductors 422 and 424 is coupled to ground by a capacitor 428, and the terminal between inductor 424 and antenna 62 is coupled to ground by a variable capacitor 430. Circuit 60 is a double-pi low pass filter which removes undesired harmonics from the output signal of transistor 402.

In the preferred embodiment of transmitter 10 described in detail above, the base frequency of oscillating circuit 54 may be tuned to a frequency between 902 and 928 MHz, where the base frequency is determined by coaxial ceramic resonator 336, and modulated based upon the voltage applied at varactor 332. This high frequency signal is applied to antenna 62 after the appropriate buffering, amplification and filtering by circuits 56, 58 and 60. By way of modification, the base frequency of oscillating circuit 54 may be tuned to frequencies outside of the 902-928 MHz frequency range, depending upon the application and particular governmental regulations.

Figure 6A:
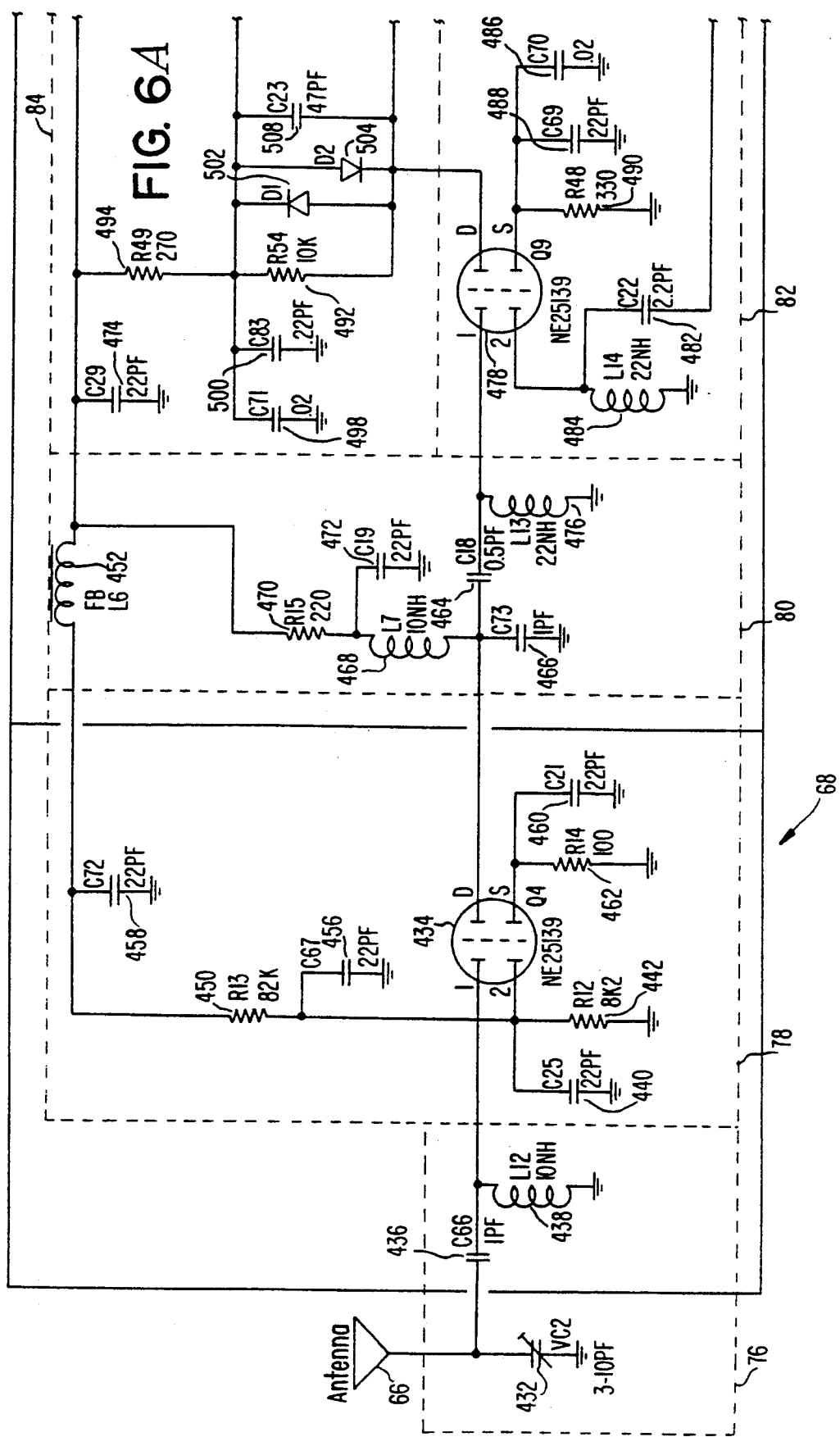
FIGS. 6A and 6B are the circuit diagram for antenna matching and intermediate frequency circuitry of the receiver configured in accordance with an embodiment of the present invention.
Figure 6B:
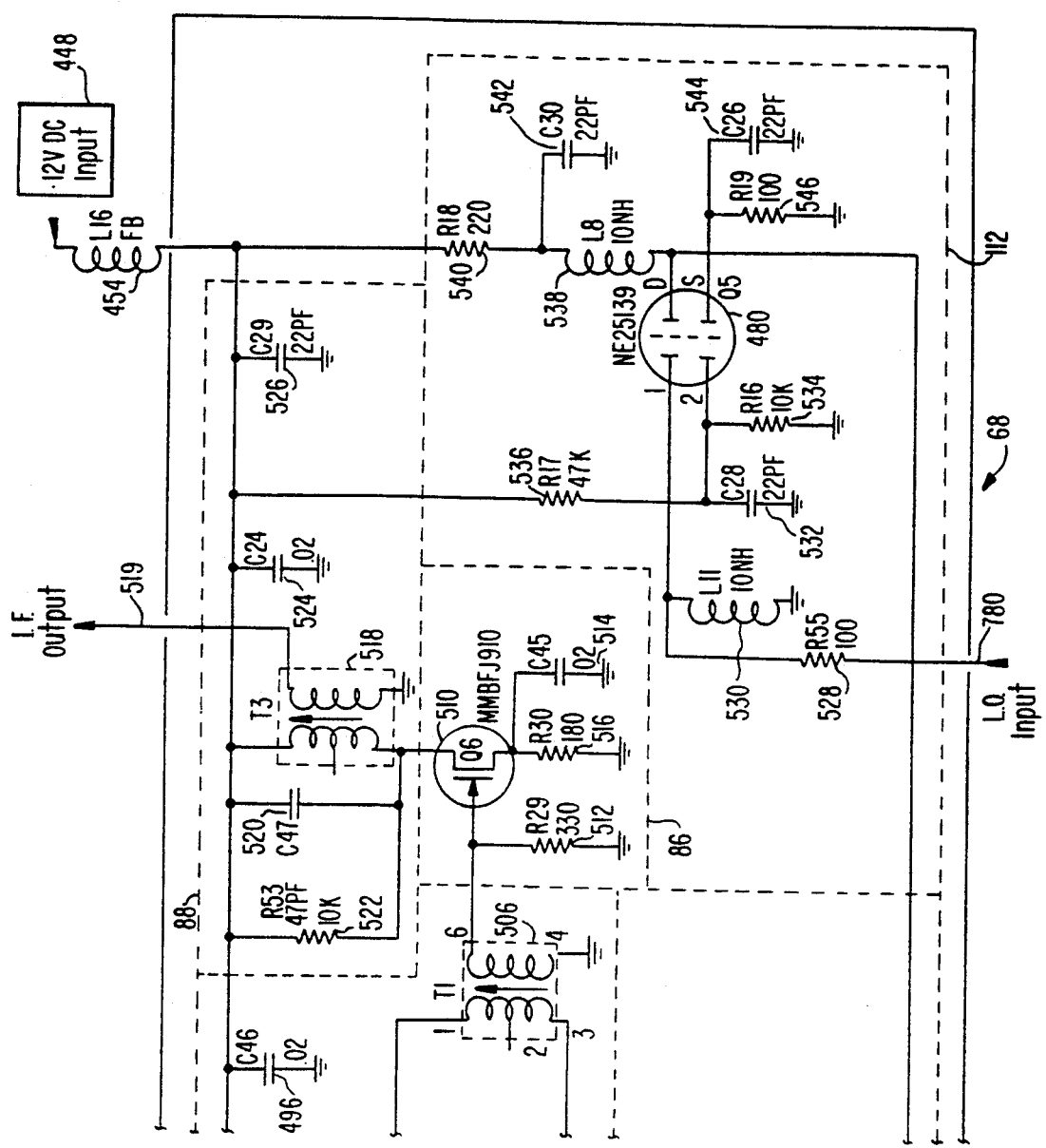

Referring to FIG. 6, FIG. 6 is the circuit diagram for antenna matching and intermediate frequency (IF) circuitry 68. The electromagnetic waves from antenna 62 which are received by antenna 66 produce a signal in antenna matching circuits 76. Antenna 66 is coupled to ground by a variable capacitor 432. The terminal between antenna 66 and capacitor 432 is coupled to one gate (1) of dual gate transistor 434 by a capacitor 436.

The terminal between gate 1 of transistor 434 and capacitor 436 is coupled to ground by inductor 438. Capacitor 436 and inductor 438 impedance match antenna 66 to transistor 434.

Transistor 434 is the main component of radio frequency (RF) amplifying circuit 78. The second gate (2) of transistor 434 is coupled to ground by a capacitor 440 arranged in parallel with a resistor 442. The second gate of transistor 434 is also coupled to a 12 volt DC source 448 which may be of a conventional source having a configuration such as the power supply for transmitter 10. A series arrangement of a resistor 450, an inductor 452, and an inductor 454 connect gate 2 of transistor 434 to DC source 448. The terminal between gate 2 and resistor 450 is coupled to ground by capacitor 456, and the terminal between resistor 450 and inductor 452 is coupled to ground by capacitor 458. Inductor 452, inductor 454, capacitor 456 and capacitor 458 serve to further filter the DC voltage supplied by source 448 to transistor 434 to avoid introducing unwanted noise into circuit 78. The source (S) of transistor 434 is coupled to ground by a capacitor 460 arranged in parallel with resistor 462.

The drain (D) of transistor 434 is coupled to band pass filter circuit 80. In particular, the drain is coupled to a capacitor 464 where the terminal between capacitor 464 and the drain is coupled to ground by a capacitor 466, and this terminal is also coupled to DC source 448 by a series arrangement of an inductor 468, a resistor 470 and inductor 454. The terminal between inductor 468 and resistor 470 is coupled to ground by a capacitor 472, and the terminal between resistor 470 and inductor 454 is coupled to ground by capacitor 474. Capacitors 472 and 474, and inductor 468 provide filtering for the DC voltage applied by source 448 to circuit 80. The side of capacitor 464 opposite the drain of transistor 434 is coupled to ground by inductor 476. The arrangement of capacitor 464, capacitor 466, and inductor 476 provides a band pass filter for the signal produced by the drain of transistor 434.

The terminal between capacitor 464 and inductor 476 is coupled to one gate (1) of a dual gate transistor 478, which is the main component of mixing circuit 82. The second gate (2) of transistor 478 is coupled to the drain of dual gate transistor 480 which is the main component of buffering circuit 112. Gate 2 of transistor 478 is coupled to the drain of transistor 480 by capacitor 482, and gate 2 of transistor 478 is also coupled to ground by an inductor 484. The source of transistor 478 is coupled to ground by a parallel arrangement of a capacitor 486, a capacitor 488 and a resistor 490. The difference of the signal from band pass filter circuit 80 and buffering circuit 112 are produced at the drain of transistor 478 which is coupled to intermediate frequency (IF) filtering circuit 84. IF filtering circuit 84 provides a band pass filter, centered upon the IF frequency, for the difference of the signals.

The drain of transistor 478 is coupled to DC source 448 by a resistor 492 arranged in series with a resistor 494 and inductor 454. The terminal between inductor 454 and resistor 494 is coupled to ground by a capacitor 496 which provides filtering for the voltage applied by source 448 to circuit 84. The terminal between resistor 492 and resistor 494 is coupled to ground by a capacitor 498 and capacitor 500 arranged in parallel, which provide filtering. The drain of transistor 478, in addition to being coupled to resistor 492, is coupled to the anode of a diode 502, the cathode of a diode 504, and the primary winding of a transformer 506. Resistor 492, diode 502, diode 504 and the primary winding of transformer 506 are arranged in parallel along with a capacitor 508. This arrangement provides filtering and isolation for the signal from the drain of transistor 478. Diodes 502 and 504 provide amplitude limitation to prevent overload. For example, an overload condition may occur when transmitter 10 is close to receiver 12. Transformer 506 provides a component of the band pass IF filtering in circuit 84.

The secondary winding of transformer 506 is coupled between ground and IF amplifying circuit 86. The secondary winding is coupled to the gate of a transistor 510, where the gate is also coupled to ground by a resistor 512. The source of transistor 510 is coupled to ground by a capacitor 514 arranged in parallel with a resistor 516. The drain of transistor 510 is coupled to the primary winding of a transformer 518 in IF filtering circuit 88. The primary winding is also coupled to DC source 448, a capacitor 520 and resistor 522 are arranged in parallel across the primary winding. To provide further filtering for the DC voltage applied to circuit 88, capacitors 524 and 526 connect the output of inductor 454 to ground. The secondary winding of transformer 518 is coupled between ground and frequency control circuit 72.

Referring again to mixing circuit 82, a buffering circuit 112 provides a signal to circuit 82. Circuit 112 is coupled to local oscillator circuit 70 by a resistor 528 which is coupled to one gate (1) of transistor 480. To provide filtering and impedance matching, an inductor 530 is coupled between ground and gate 1. The second gate (2) of transistor 480 is coupled to ground by a capacitor 532 arranged in parallel with a resistor 534. Gate 2 is also coupled to DC source 448 by a resistor 536 coupled to inductor 454. The drain of transistor 480 is also coupled to source 448 by an inductor 538, a resistor 540 and inductor 454 The terminal between inductor 538 and resistor 540 is coupled to ground by a capacitor 542. As discussed above, the drain of transistor 480 is also coupled to gate 2 of transistor 478 by capacitor 482. The source of transistor 480 is coupled to ground by a capacitor 544 arranged in parallel with a resistor 546. Capacitor 542 and inductor 438 provide filtering and isolation of the voltage applied by source 448 to the drain of transistor 480. This arrangement for gate 2 provides a DC bias to gate 2.

Figure 7A:
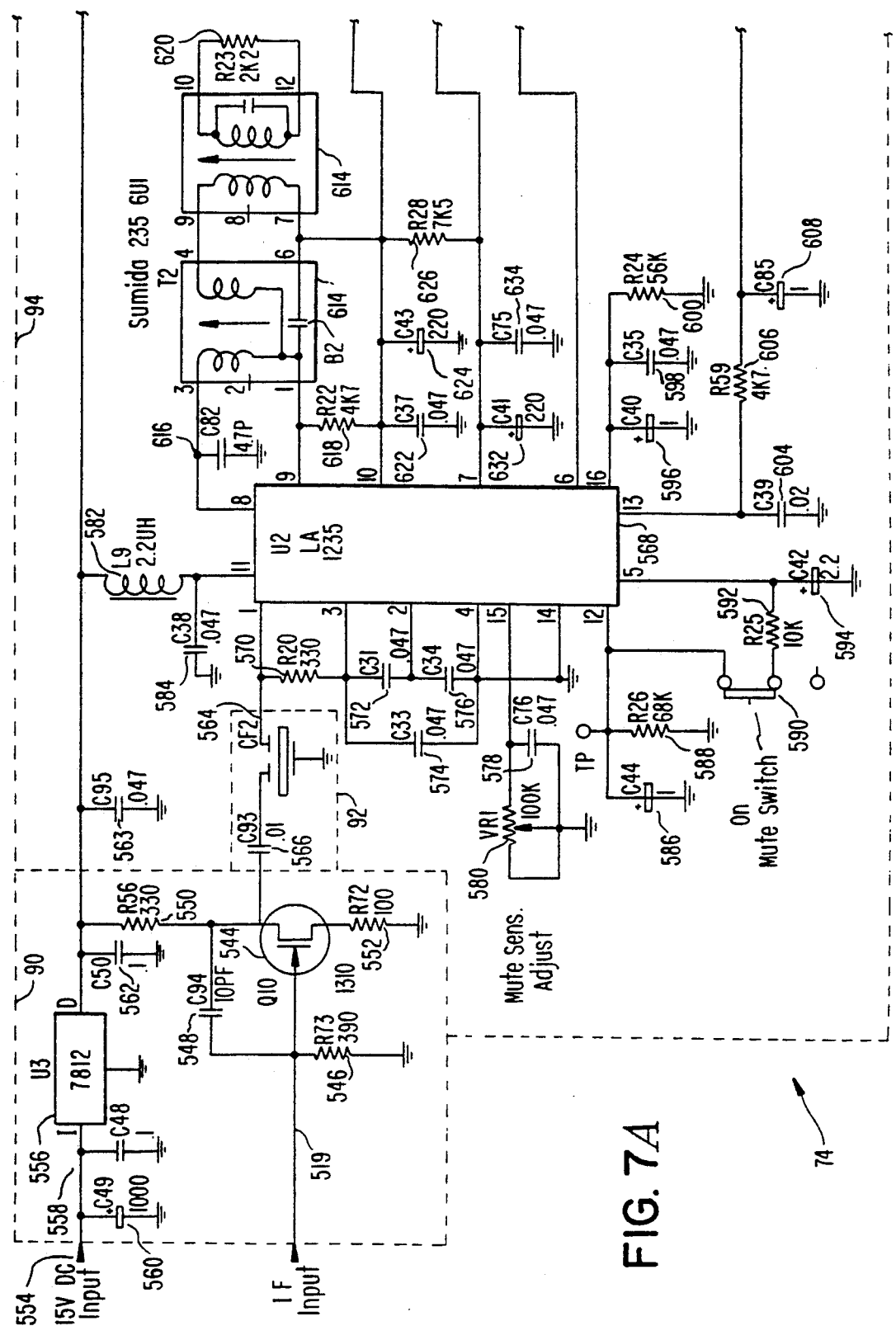
FIGS. 7A and 7B are the circuit diagram for frequency demodulation circuitry of the receiver configured in accordance with an embodiment of the present invention.
Figure 7B:
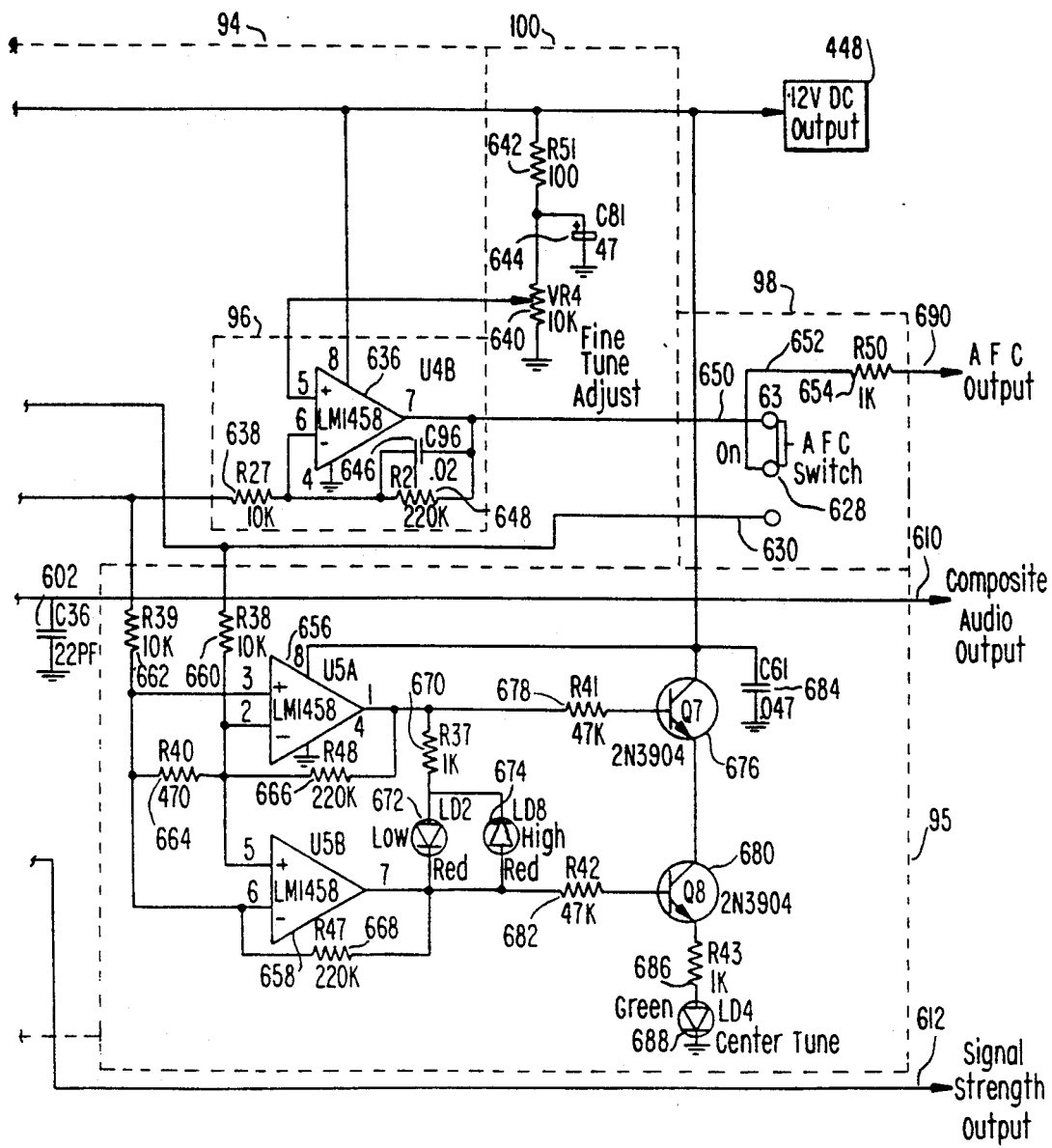

Referring to FIG. 7, FIG. 7 is a circuit diagram for frequency demodulation circuitry 72. The signal from the secondary winding of transformer 518 (IF output 519) of antenna matching and IF circuitry 68 is applied to the gate of a transistor 544, which is the main component of IF amplifying circuit 90. The gate of transistor 544 is coupled to ground by a resistor 546 and also coupled to the drain of transistor 544 by a capacitor 548. The drain of transistor 544 is also coupled to DC source 448 by a resistor 550. The source of transistor 544 is coupled to ground by a resistor 552. The drain of transistor 544 is coupled to IF filtering circuit 92. Resistor 550 provides impedance matching between circuits 90 and 92. Capacitor 548 corrects the phase shift introduced by circuit 92.

The 12 volt DC source will now be described in more detail. Source 448 is connected to circuit 90, which is connected to a 15 volt DC supply 554 coupled to the input of a conventionally grounded voltage regulator 556. The input of voltage regulator 556 is coupled to ground by a capacitor 558 in parallel with a capacitor 560. Capacitors 558 and 560 provide high and low frequency filtering at the input of regulator 556. Source 448 is provided at the output of regulator 556, where the output is coupled to ground by a capacitor 562 which provides a degree of filtering for the output voltage of regulator 556.

IF filtering circuit 92 includes a ceramic filter 564 which is conventionally grounded. A capacitor 566 couples the drain of transistor 554 to ceramic filter 564. Filter 564 is coupled to limiting amplifier and quadrature detecting circuit 94. In particular, filter 564 is coupled to intermediate frequency detector 568. Circuit 92 provides highly selective band pass filtering about the IF frequency.

The filtered signal from filter 564 is coupled directly to pin 1 of detector 568 and coupled to pin 3 of detector 568 by resistor 570. Pin 3 is coupled to pin 2 of detector 568 by a capacitor 572 and coupled to pins 4 and 14 (ground) by capacitor 574. Pin 2 is coupled to ground by capacitor 576. Pin 15 of detector 568 is coupled to ground by a capacitor 578 arranged in parallel with a potentiometer 580. Potentiometer 580 allows adjustment of the mute threshold. Pin 11 of detector 568 is coupled to DC source 448 by an inductor 582 for filtering. To provide additional filtering of the voltage from source 448, a capacitor 584 is coupled at the terminal between detector 568 and inductor 582. Still further filtering of the voltage at source 448 is provided by a capacitor 563 coupled between source 448 and ground at circuit 94. Pin 12 of detector 568 is coupled to ground by capacitor 586 arranged in parallel with a resistor 588. Pin 12 is also coupled to pin 5 by a single pole, double throw switch 590 arranged in series with a resistor 592. The terminal between resistor 592 and pin 5 is coupled to ground by a capacitor 594. With switch 590 in the ON mode, muting is provided, and with switch 590 in the OFF mode, muting is defeated. Pin 16 of detector 568 is coupled to ground by a capacitor 596 arranged in parallel with a capacitor 598 and resistor 600.

Pin 6 of detector 56 outputs the composite audio signal and is coupled to ground by capacitor 602 which provides a certain level of filtering. Pin 13 outputs a signal strength signal and is coupled to ground by a capacitor 604 in parallel with the series arrangement of resistor 606 and capacitor 608, where the signal strength signal is produced at the terminal between resistor 60 and capacitor 608. Conductors 610 and 612 provide the composite audio signal and signal strength signal, respectively, to audio output circuitry 74, which will be described in detail below.

The production of the automatic frequency control (AFC) signal will now be discussed. Pins 8 and 9 of detector 568 are coupled to a quadrature detection coil 614. Pin 8 is also coupled to ground by a capacitor 616, and pin 9 is coupled to pin 10 of detector 568 by a resistor 618. A resistor 620 is coupled across the secondary winding of the second transformer in quadrature detect coil 614 to linearize the response of detector 568. Pin 10 of detector 568 is coupled to ground by capacitor 622 arranged in parallel with capacitor 624. Pin 10 is also coupled to pin 7 by resistor 626 and directly coupled to the connection between the secondary winding and primary windings of the transformers in quadrature detect coil 614. Quadrature detect coil arrangement 614 as arranged with detector 568 provides FM demodulation.

Pin 10 is also coupled to a terminal of AFC switch 628 of AFC tuning circuit 98 by a conductor 630. Pin 7 of detector 568 is coupled to AFC buffering circuit 96, and also coupled to ground by a capacitor 632 arranged in parallel with a capacitor 634. Capacitors 622, 624 and 634 provide high and low frequency filtering. Pin 7 is coupled to the inverting input of an op amp 636 by a resistor 638. The non-inverting input of op amp 636 is coupled to the center tap of a potentiometer 640 of fine tuning circuit 100. The bottom of potentiometer 640 is coupled to ground and the top to DC source 448 by a resistor 642. The terminal between potentiometer 640 and resistor 642 is coupled to ground by a capacitor 644 to filter the voltage applied to op amp 636. The output of op amp 636 is coupled to the inverting input by a capacitor 646 arranged in parallel with a resistor 648 to provide the appropriate feedback and filtering for op amp 636.

The output of op amp 636 is provided to switch 628 of AFC tuning circuit 98 by a conductor 650. Switch 628 is a single pole, double throw switch which allows the connection of a conductor 652 to either the output of op amp 636 or pin 7 of detector 568. With this circuit, either a reference DC voltage from pin 7 or an AFC signal can be provided to conductor 652 as desired. Conductor 652 is coupled to a resistor 654 which is coupled to local oscillator circuitry 70.

Pins 10 and 7 are also coupled to center tune indicator 95. In particular, pin 10 is coupled to the inverting input of an op amp 656 and the non-inverting input of an op amp 658 by a resistor 660. The inverting input of op amp 658 and the non-inverting input of op amp 656 is coupled to the non-inverting input of op amp 656 and the inverting input of op amp 658 by a resistor 662. Pin 7 is coupled to the inverting input of op amp 656 and the non-inverting input of op amp 658 by resistor 664. A resistor 666 is coupled between the output of op amp 656 and the inverting input for feedback. A resistor 668 is coupled between the output and inverting input of op amp 658 for feedback. The outputs of op amps 656 and 658 are coupled by a resistor 670 to the anode of an LED 672 and the cathode of an LED 674, where the cathode of LED 672 and anode of LED 674 are coupled to the output of op amp 658. The output of op amp 656 is coupled to the base of a transistor 676 by a resistor 678, and the output of op amp 658 is coupled to the base of a transistor 680 by a resistor 682. Op amps 656 and 658 are part of a dual op amp package which is appropriately grounded and coupled to DC source 448.

The collector of transistor 676 is coupled to DC source 448 and also coupled to ground by capacitor 684 to provide filtering for the voltage supplied by source 448. The emitter of transistor 676 is coupled to the collector of transistor 680, and the emitter of transistor 680 is coupled to ground by a series arrangement of resistor 686 and LED 688, where the cathode of LED 688 is coupled to ground. Center tune indicator 95 operates such that when the circuit is properly center tuned via potentiometer 640, LED 688 is lit. When the receiver is not properly center tuned, either LED 672 or 674 is lit, depending upon whether it is tuned low or high.

Figure 8A:
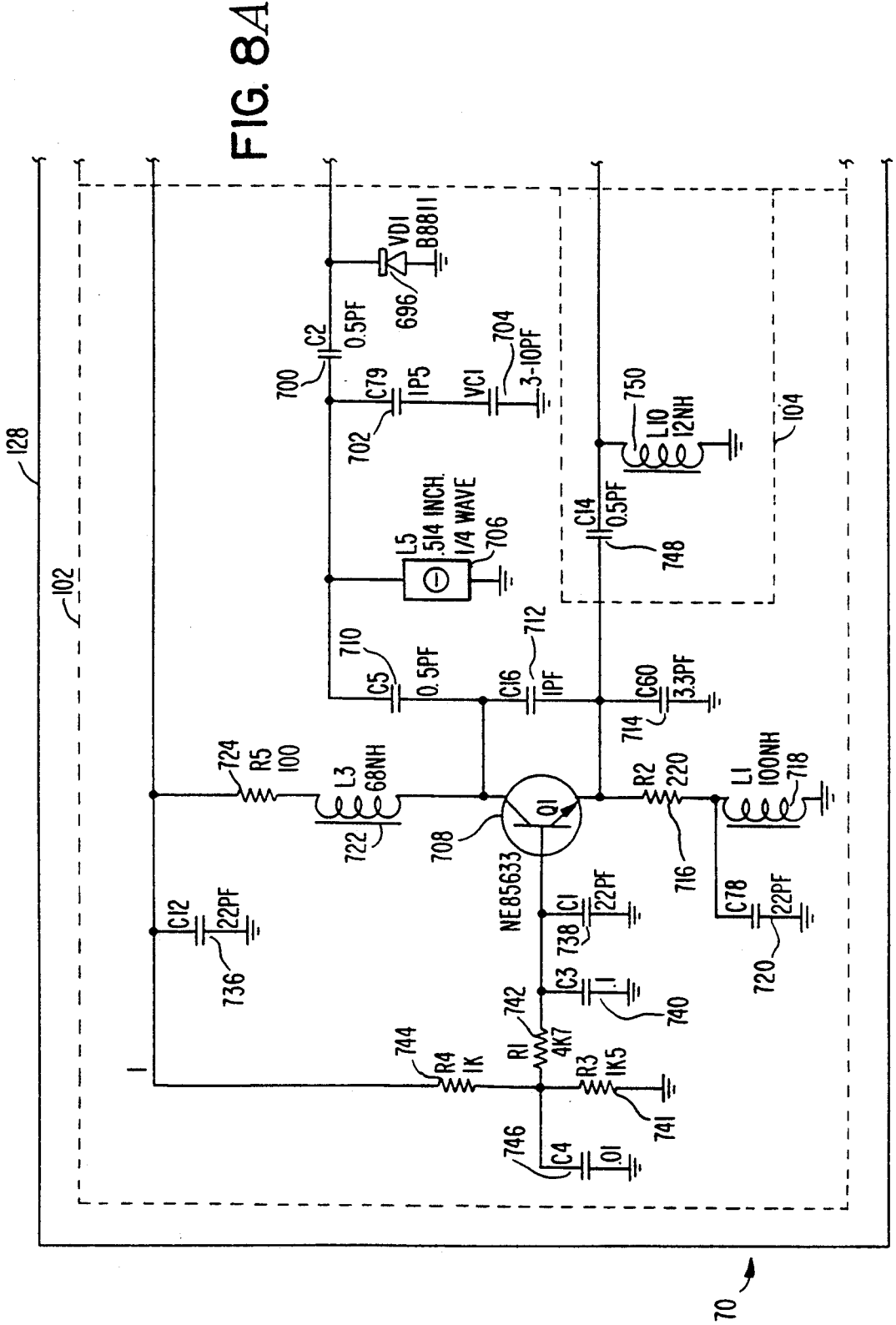
FIGS. 8A and 8B are the circuit diagram for local oscillator circuitry for the receiver configured in accordance with an embodiment of the present invention.
Figure 8B:
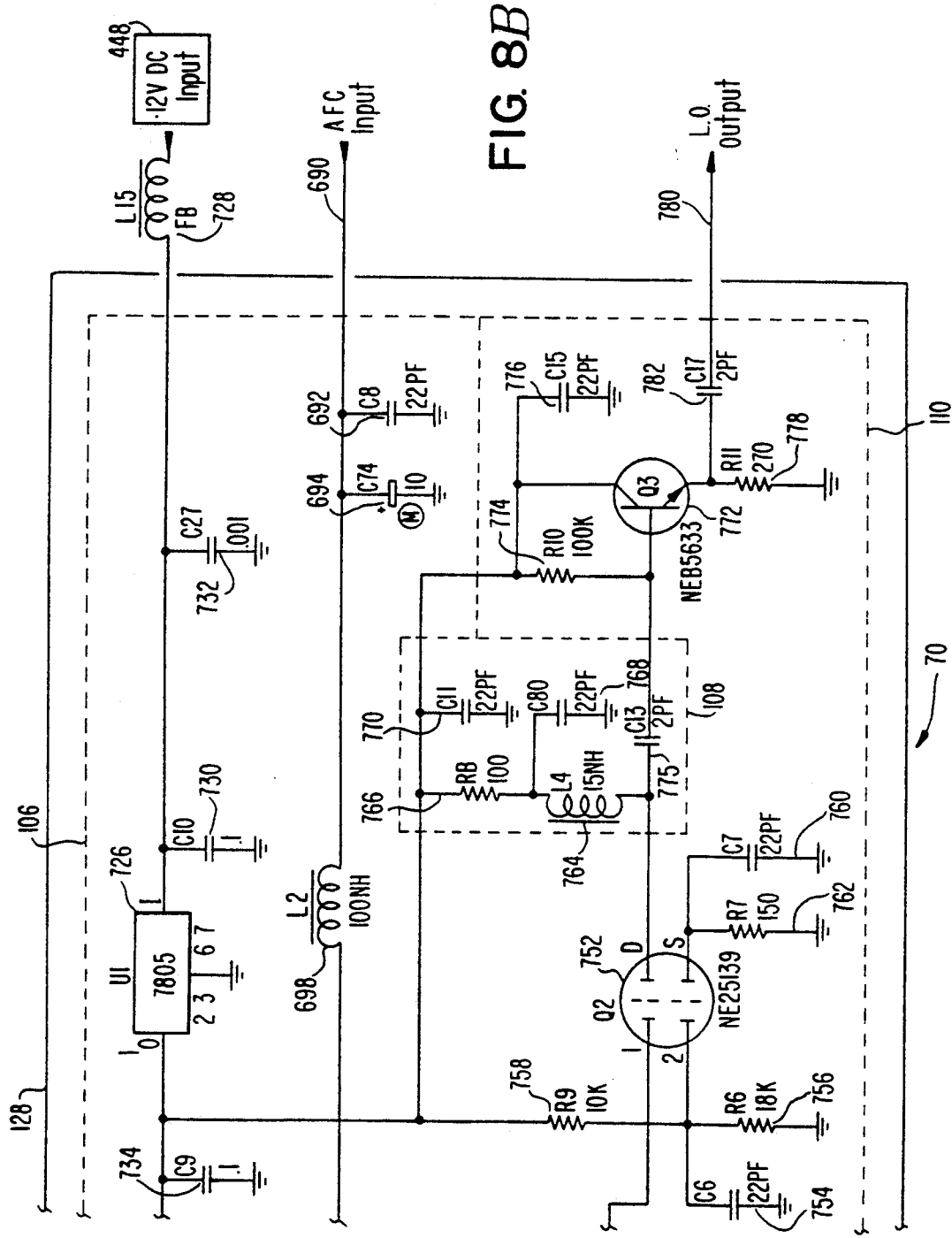

Referring to FIG. 8, FIG. 8 illustrates the circuit diagram for local oscillator circuitry 70. Resistor 654 of frequency control circuitry 72 is coupled to conductor portion 690 of circuit 70. The AFC signal from circuit 72 is applied to conductor portion 690, and conductor portion 690 is coupled to ground by capacitor 692 arranged in parallel with capacitor 694. Conductor 690 is also coupled to the cathode of varactor 696 by an inductor 698. The combination of resistor 654, capacitor 692, capacitor 694 and inductor 698 provides high and low frequency filtering for the AFC signal. The anode of varactor 696 is coupled to ground, where the cathode of varactor 696 is also coupled to ground by a series arrangement of a capacitor 700, a capacitor 702, and a variable capacitor 704.

The terminal between capacitors 700 and 702 is coupled to a coaxial ceramic resonator 706 which is also coupled to ground. Both resonators 336 (discussed above) and 706 have very high Q values in the range of 400. The capacitance of varactor 696 is controlled by the AFC input signal and corrects the frequency of resonator 706, which controls the frequency of the signal produced by local oscillator circuit 102. Resonator 706 is coupled to the collector of a transistor 708 by capacitor 710, where the collector and emitter of transistor 708 are coupled by capacitor 712. The emitter of transistor 708 is coupled to ground by a capacitor 714 and also coupled to ground by a resistor 716 coupled to an inductor 718, which is coupled to ground in parallel with a capacitor 720. The collector of transistor 708 is coupled to DC source 448 by an inductor 722, a resistor 724, a voltage regulator 726 and an inductor 728. Capacitors 730 and 732 couples the input of voltage regulator 726 to ground to provide filtering for the voltage from source 448, and capacitor 734 couples the output of voltage regulator 726 to ground to further filter the voltage output of regulator 726. In addition to capacitor 734, circuit 102 includes a capacitor 736 coupled between the output of regulator 726 and ground to provide still further filtering for the voltage applied to circuit 102. The arrangement of voltage regulator 726 provides a stable 5 volt source for oscillator circuit 102.

The base of transistor 708 is coupled to ground by a capacitor 738 and a capacitor 740, and also coupled to the output of regulator 726 by a resistor 742 coupled in series with a resistor 744. The terminal between resistors 742 and 744 is coupled to ground by a capacitor 746, and resistor 741.

The emitter of transistor 708 is coupled to band pass filter circuit 104. In particular, the emitter of transistor 708 is coupled to a capacitor 748, where capacitor 748 is coupled to ground by an inductor 750 on its side opposite to transistor 708. The signal from the emitter of transistor 708 is filtered by the combination of capacitor 748 and inductor 750 which act as a band pass filter, passing the oscillating frequency of circuit 102. Resonator 706 provides advantages and improvements in performance similar to those provided by resonator 336, but in the context of a receiver. Transistor 708 is configured similar to transistor 346 to form a common base Colpitts oscillator.

The terminal between capacitor 748 and inductor 750 is coupled to one gate (1) of a dual gate transistor 752, which is the main component of buffering circuit 106. Transistor 752 provides high reverse isolation between band pass filter circuit 108 and band pass filter 104. The second gate (2) of transistor 752 is coupled to ground by a capacitor 754 in parallel with a resistor 756. Gate 2 of transistor 752 is also coupled to the output of voltage regulator 726 by a resistor 758. The source of transistor 752 is coupled to ground by a capacitor 760 in parallel with a resistor 762.

The drain of transistor 752 is coupled, and provides the signal at the drain, to band pass filter circuit 108. In particular, the drain is coupled to the output of voltage regulator 726 by an inductor 764 arranged in series with a resistor 766. The terminal between inductor 764 and resistor 766 is coupled to ground by a capacitor 768, and the terminal between resistor 766 and the output of regulator 726 is coupled to ground by a capacitor 770. The arrangement of the inductor 764, resistor 766, capacitor 768 and capacitor 770 provide a band pass filter for the signal at the drain of transistor 752, where the signal is filtered to pass the oscillating frequency of circuit 102.

The drain of transistor 752 is also coupled to the base of a transistor 772 by a capacitor 775. Transistor 772 provides the buffering in buffering circuit 110. The collector of transistor 772 is coupled to the output of regulator 726, and also coupled to the base of transistor 772 by a resistor 774. A capacitor 776 couples the collector of transistor 772 to ground to provide filtering. The emitter of transistor 772 is coupled to ground by a resistor 778, and coupled to a conductor portion 780 by a capacitor 782. As discussed above briefly, conductor 780 is coupled to resistor 528 of antenna matching and intermediate frequency circuit 68 to provide the signal at the emitter of transistor 772 to circuit 68. This signal is applied to circuit 68 and used in the hetrodyning process carried out by circuit 68.

Figure 9A:
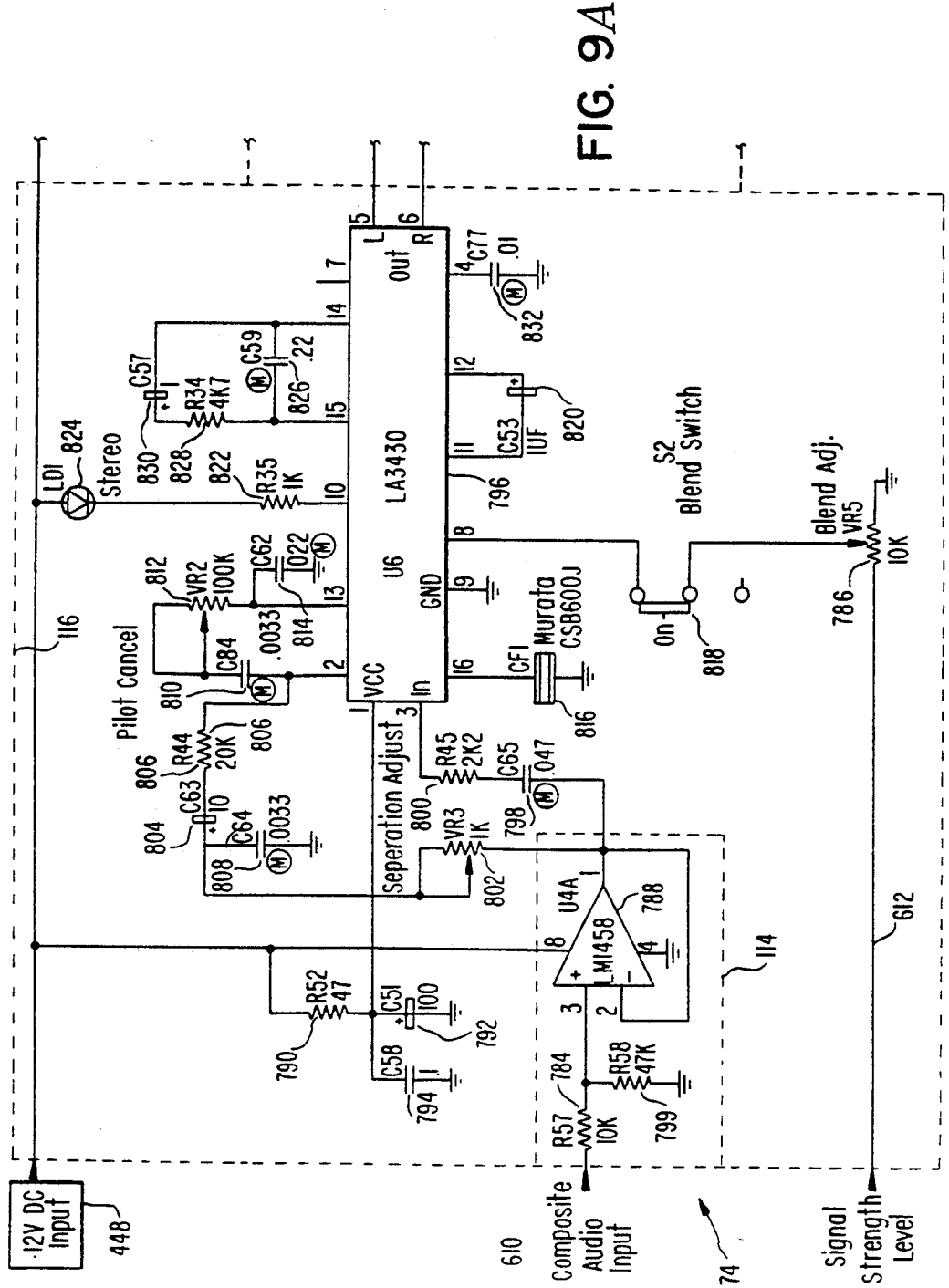
FIGS. 9A and 9B are the circuit diagram for demultiplexing and audio output circuitry of the receiver configured in accordance with an embodiment of the present invention.
Figure 9B:
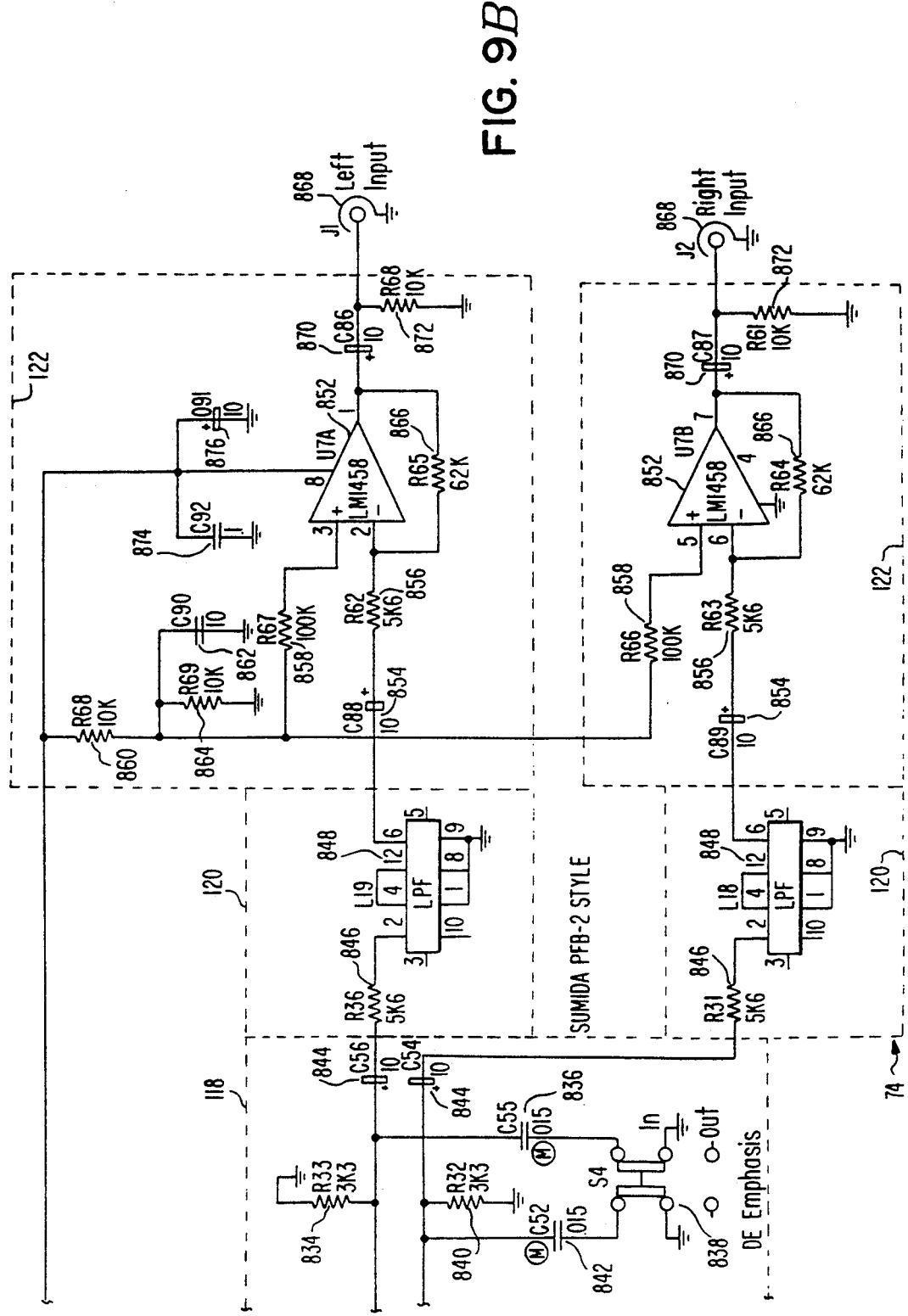

Referring to FIG. 9, FIG. 9 is the circuit diagram for demultiplexing and audio output circuitry 74. As discussed above, conductors 610 and 612 of frequency control circuitry 72 are coupled to demultiplexing and audio output circuitry 74 to provide the composite audio signal and signal strength signal to circuitry 74. In particular, conductor 610 is coupled to a resistor 784 in buffering circuit 114, and conductor 612 is coupled to potentiometer 786 in stereo decoding circuit 116. Resistor 784 is also coupled to the non-inverting input of op amp 788. The non-inverting input of op amp 788 is also coupled to ground by resistor 799. Op amp 636 (FIG. 7) and op amp 788 are part of a dual op amp package where the package is appropriately grounded and coupled to DC source 448. The output of op amp 788 is coupled to the inverting input to provide unity gain such that op amp 788 provides buffering without gain.

To provide filtering for the voltage applied to the demultiplexer 796, the power terminal of the package is coupled to DC source 448 by a resistor 790. Capacitor 792, which is in parallel with a capacitor 794, couples this terminal to ground. The output of op amp 788 is applied to the input of demultiplexor 796 by the series arrangement of a capacitor 798 and a resistor 800. The output of op amp 788 is also coupled to pin 2 of demultiplexer 796 by a series arrangement of a potentiometer 802, capacitor 804 and a resistor 806. A capacitor 808 is provided at the terminal between potentiometer 802 and capacitor 804 to provide further filtering of this signal.

Pin 2 of demodulator 796 is coupled to pin 13 by a capacitor 810 and a potentiometer 812. Pin 13 is coupled to ground by a capacitor 814. The purpose of connecting pin 2 to pin 13 in this manner is to cancel the pilot signal. Pin 16 is coupled to ground by a ceramic resonator 816 to form a 600 KHz signal to clock demultiplexor 796. Pin 8 of demultiplexor 796 is coupled to the center tab of potentiometer 786 by a single pole, double throw switch 818 to enable the stereo blending function. Pin 10 of demodulator 796 is coupled to source 448 by a resistor 822 coupled in series with an LED 824, where the anode of LED 824 is coupled to source 448 such that LED 824 is illuminated when a stereo signal is produced by 796. Pins 15 and 14 are coupled by a capacitor 826 coupled in parallel with a series arrangement of a resistor 828 and capacitor 830. Pin 9 of demodulator 796 is coupled to ground, and pin 4 of demodulator 796 is coupled to ground by a capacitor 832. Pins 5 and 6 of demodulator 796 provide left and right signals, respectively, to de-emphasis circuit 118.

Pin 5 is coupled to ground by a resistor 834, and coupled to ground by a capacitor 836 in series with a double pole, double throw switch 838. Pin 6 is coupled to ground by a resistor 840 and a capacitor 842 in series with switch 838. De-emphasis is applied, depending upon the position of switch 838. More specifically, pins 5 and 6, the left and right channels, respectively, are coupled to ground by capacitors 836 and 842, respectively, when the switch is switched to the de-emphasis mode, i.e., coupling capacitors 836 and 842 to ground.

The left channel (pin 5) and right channel (pin 6) are coupled by capacitors 844 and resistors 846 to pilot filters 848. Pilot filters 848 are the main components of pilot filtering circuits 120 and filter the left and right channels signals from demultiplexor 796 to pass only the frequencies between 20 Hz and 20 KHz. The outputs of filters 848 are applied to the inverting inputs of operational amplifiers 852 via series arrangements of a capacitor 854 and resistor 856. The non-inverting inputs of op amps 852 are coupled to DC supply 448 by resistors 858 coupled in series with resistor 860 to provide filtering for the voltage at DC source 448, the terminal between resistors 858 and 860 is coupled to ground by a capacitor 862 arranged in parallel with a resistor 864. The inverting inputs of op amps 852 are coupled to their outputs by a feedback resistor 866. The outputs of op amps 852 are applied to conventional jacks 868 by a capacitor 870, where the terminal between capacitor 870 and jacks 868 are coupled to ground by a resistor 872.

Op amps 852 are part of a dual op amp package which is appropriately grounded and coupled to DC source 448 for power. The power terminal of the dual op amp package is filtered by capacitors 874 and 876. Jacks 868 may be coupled to respective conventional audio power amplifiers 124 which amplify the stereo output signals such that they may drive respective audio speakers 126.

TABLE A

| DRAWING REF. # | DESCRIPTION | PART # OR VALUE | REF. # |
|---|---|---|---|
| 132 | 120 V AC INPUT | | |
| 134 | POWER TRANSFORMER | | T1 |
| 136 | FUSE | | F1 |
| 138 | 1 AMP BRIDGE RECT | 1N4001 | D3 |
| 140 | POS 12 VOLT REG | 7812 | U2 |
| 142 | 20% 35 V | 2200 uF | C17 |
| 144 | Z5U 25 V | .1 uF | C18 |
| 146 | .25 W 5% CARBON FILM | 1K5 | R27 |
| 148 | LIGHT EMITTING DIODE GREEN | | LD2 |
| 150 | +12 VOLTS DC | | |
| 152 | Z5U 25 V | .1 uF | C31 |
| 154 | | | |
| 156 | .25 W 5% CARBON FILM | 100K | R33 + R40 |
| 158 | .25 W 5% CARBON FILM | 4K7 | R12 + R39 |
| 160 | 5% 50 V | .001 uF | C25 + C43 |
| 162 | SUBMIN PC MOUNT POT | 50K | VR1 |
| 164 | 20% 25 V | 10 uF | C42 + C24 |
| 166 | QUAD OP AMP | | U6B + U6C |
| 168 | .25 W 5% CARBON FILM | 100K | R34 + R41 |
| 170 | 20% 25 V | 47 UF | C41 + C45 |
| 172 | .25 W 5% CARBON FILM | 3K3 | R35 + R42 |
| 174 | .25 W 5% CARBON FILM | 10K | R13 + R38 |
| 176 | QUAD OP AMP | | U6A + U6D |
| 178 | .25 W 5% CARBON FILM | 1K | R55 + R56 |

TABLE A-continued

| DRAWING REF. # | DESCRIPTION | PART # OR VALUE | REF. # |
|---|---|---|---|
| 180 | 5% 50 V | .0047 uF | C26 + C44 |
| 182 | .25 W 5% CARBON FILM | 10K | R14 + R39 |
| 184 | .25 W 5% CARBON FILM | 10K | R36 + R43 |
| 186 | RIGHT AUDIO | | |
| 188 | LEFT AUDIO | | |
| 190 | .25 W 5% CARBON FILM | 10K | R44 + R47 |
| 192 | 20% 25 V | 10 uF | C23 |
| 194 | .25 W 5% CARBON FILM | 10K | R16 |
| 196 | .25 W 5% CARBON FILM | 10K | R15 |
| 198 | .25 W 5% CARBON FILM | 47K | R46 |
| 200 | SUBMIN PC MOUNT POT | 10K | VR2 |
| 201 | .25 W 5% CARBON FILM | 100K | R25 |
| 202 | QUAD OP AMP | TL074 | U7C |
| 204 | .25 W 5% CARBON FILM | 47K | R45 |
| 206 | DUAL OP AMP | TL074 | U7B |
| 208 | .25 W 5% CARBON FILM | 1K | R19 |
| 210 | .25 W 5% CARBON FILM | 100K | R24 |
| 212 | .25 W 5% CARBON FILM | 1K | R21 |
| 214 | SIGNAL DIODE | 1N914 | D1 |
| 216 | SIGNAL DIODE | 1N914 | D2 |
| 218 | 20% 25 V | 2.2 uF | C30 |
| 220 | .25 W 5% CARBON FILM | 10K | R20 |
| 222 | NPN TRANSISTOR | 2N3904 | Q4 |
| 224 | .25 W 5% CARBON FILM | 2K2 | R22 |
| 226 | LIGHT EMITTING DIODE RED | | LD1 |
| 228 | .25 W 5% CARBON FILM | 1K | R23 |
| 230 | .25 W 5% CARBON FILM | 10K | R32 |
| 232 | 4 CH MUX DEMULTIPLEXER | CD4052 | U5 |
| 234 | .25 W 5% CARBON FILM | 10K | R31 |
| 236 | Z5U 25 V | .01 uF | C32 |
| 238 | HEX INVERT BUFFER | CD4069 | U3A |
| 240 | CERAMIC RESONATOR | 200 KHZ | CF1 |
| 242 | NPO 50 V | 330 pF | C28 |
| 244 | NPO 50 V | 470 pF | C27 |
| 246 | .25 W 5% CARBON FILM | 4K7 | R57 |
| 248 | HEX INVERT BUFFER | CD4069 | U3F |
| 250 | .25 W 5% CARBON FILM | 1M | R17 |
| 252 | 12-BIT RIPPLE CTR/D | CD4040 | U4 |
| 254 | Z5U 25 V | .01 uF | C33 |
| 256 | 5% 50 V | .015 uF | C48 |
| 258 | .25 W 5% CARBON FILM | 15K | R48 |
| 260 | 5% 50 v | .001 uF | C49 |
| 262 | QUAD OP AMP | TL074 | U7A |
| 264 | .25 W 5% CARBON FILM | 15K | R26 |
| 266 | .25 W 5% CARBON FILM | 100K | R49 |
| 268 | 5% 50 V | .001 uF | C51 |
| 270 | 5% 50 V | .001 uF | C50 |
| 272 | .25 W 5% CARBON FILM | 2K2 | R50 |
| 274 | .25 W 5% CARBON FILM | 100K | R54 |
| 276 | Z5U 25 V | .01 uF | C53 |
| 277 | .25 W 5% CARBON FILM | 10K | R60 |
| 278 | .25 W 5% CARBON FILM | 10K | R61 |
| 280 | SUBMIN PC MOUNT POT | 2K5 | VR6 |
| 282 | 5% 50 V | .0015 uF | C52 |
| 284 | .25 W 5% CARBON FILM | 10K | R51 |
| 286 | SUBMIN PC MOUNT POT | 1K | VR5 |
| 288 | QUAD OP AMP | TL074 | U7D |
| 290 | .25 W 5% CARBON FILM | 4K7 | R53 |
| 292 | .25 W 5% CARBON FILM | 10K | R52 |
| 294 | .25 W 5% CARBON FILM | 20K | R18 |
| 296 | 1206 SMT CAP NPO 50 V | 22 pF | C40 |
| 298 | MODULATION OUTPUT | | |
| 300 | SUBMIN PC MOUNT POT | 1K | VR4 |
| 302 | .25 W 5% CARBON FILM | 1K | R58 |
| 304 | RF CHOKE | 820 uH | L14 |
| 306 | RF CHOKE | 2.5 mH | L13 |
| 308 | RF CHOKE | 820 uH | L12 |
| 310 | 20% 25 V | 10 uF | C39 |
| 311 | .25 W 5% CARBON FILM | 1K | R59 |
| 312 | 5% 50 V | .0022 uF | C47 |
| 314 | 5% 50 V | .0022 uF | C46 |
| 315 | SUBMIN PC MOUNT POT | 1K | VR3 |
| 316 | 20% 25 V | 10 uF | C29 |
| 318 | SURF MOUNT COIL | 100 nH | L2 |
| 320 | 1206 SMT CAP NPO 50 V | 22 pF | C8 |
| 322 | NPO 50 V | 470 pF | C38 |
| 324 | 1206 SMT RESISTOR | 1K8 | R7 |

TABLE A-continued

| DRAWING REF. # | DESCRIPTION | PART # OR VALUE | REF. # |
|---|---|---|---|
| 326 | POS 5 VOLT REG | | U1 |
| 328 | 1206 SMT CAP Z5U 50 V | .1 uF | C10 |
| 330 | SURF MOUNT COIL | 100 nH | L11 |
| 332 | VARACTOR DIODE | | VD1 |
| 334 | 1206 SMT RESISTOR | 10K | R29 |
| 336 | COAXIAL CERAMIC RESONATOR | | L5 |
| 338 | 1206 SMT CAP NPO 50 V | 0.5 pF | C2 |
| 340 | 1206 SMT CAP NPO 50 V | 1 pF | C15 |
| 342 | CERAMIC TRIM CAP | 1-10 PF | VC1 |
| 344 | 1206 SMT CAP NPO 50 V | 0.5 pF | C5 |
| 346 | NPN TRANSISTOR | NE85633 | Q1 |
| 348 | 1206 SMT RESISTOR | 100 | R5 |
| 350 | SURF MOUNT COIL | 68 nH | L3 |
| 352 | 1206 SMT CAP Z5U 50 V | .1 uF | C9 |
| 354 | 1206 SMT CAP Z5U 50 V | 22 pF | C12 |
| 356 | 1206 SMT RESISTOR | 1K | R4 |
| 358 | 1206 SMT RESISTOR | 4K7 | R1 |
| 360 | Z5U 25 V | .01 uF | C4 |
| 362 | 1206 SMT RESISTOR | 1K5 | R3 |
| 364 | 1206 SMT CAP Z5U 50 V | .1 uF | C3 |
| 366 | 1206 SMT CAP Z5U 50 V | 22 pF | C1 |
| 368 | 1206 SMT CAP NPO 50 V | 1 pF | C16 |
| 370 | SURF MOUNT COIL | 100 nH | L1 |
| 372 | 1206 SMT CAP NPO 50 V | 22 pF | C37 |
| 374 | 1206 SMT RESISTOR | 220 | R2 |
| 376 | 1206 SMT CAP NPO 50 V | 3.3 pF | C19 |
| 378 | 1206 SMT CAP NPO 50 V | 0.5 pF | C14 |
| 380 | DUAL GATE MOSFET | NE25139 | Q2 |
| 382 | SURF MOUNT COIL | 12 nH | L6 |
| 384 | 1206 SMT CAP NPO 50 V | 22 pF | C6 |
| 386 | 1206 SMT RESISTOR | 18K | R8 |
| 388 | 1206 SMT RESISTOR | 10K | R10 |
| 390 | 1206 SMT CAP NPO 50 V | 22 pF | C7 |
| 392 | 1206 SMT RESISTOR | 150 | R9 |
| 394 | SURF MOUNT COIL | 15 nH | L4 |
| 396 | 1206 SMT RESISTOR | 100 | R30 |
| 398 | 1206 SMT CAP NPO 50 V | 22 pF | C11 |
| 400 | 1206 SMT CAP NPO 50 V | 1 pF | C13 |
| 402 | NPN TRANSISTOR | NE85633 | Q3 |
| 404 | 1206 SMT RESISTOR | 680 | R28 |
| 406 | 1206 SMT RESISTOR | 33K | R11 |
| 408 | 1206 SMT CAP NPO 50 V | 22 pF | C36 |
| 410 | 1206 SMT RESISTOR | 150 | R6 |
| 412 | FERRITE BEAD | | L7 |
| 414 | SURF MOUNT COIL | 12 nH | L10 |
| 416 | 1206 SMT CAP NPO 50 V | 22 pF | C34 |
| 418 | 1206 SMT CAP NPO 50 V | 22 pF | C22 |
| 420 | 1206 SMT CAP NPO 50 V | 1 pF | C35 |
| 422 | SURF MOUNT COIL | 4.7 nH | L8 |
| 424 | SURF MOUNT COIL | 4.7 nH | L9 |
| 426 | 1206 SMT CAP NPO 50 V | 3.3 pF | C20 |
| 428 | 1206 SMT CAP NPO 50 V | 4.7 pF | C21 |
| 430 | CERAMIC TRIM CAP | 3-10 PF | VC2 |

TABLE B

| DRAWING REF. # | DESCRIPTION | PART # OR VALUE | REF. # |
|---|---|---|---|
| 432 | CERAMIC TRIM CAP | 3-10 PF | VC2 |
| 434 | NPN TRANSISTOR | NE25139 | Q4 |
| 436 | 1206 SMT CAP NPO 50 V | 1 pF | C66 |
| 438 | SURF MOUNT COIL | 10 NH | L12 |
| 440 | 1206 SMT CAP NPO 50 V | 22 pF | C25 |
| 442 | 1206 SMT RESISTOR | 8K2 | R12 |
| 444 | | | |
| 446 | | | |
| 448 | 12 V DC INPUT | | |
| 450 | 1206 SMT RESISTOR | 82K | R13 |
| 452 | FERRITE BEAD | | L6 |
| 454 | FERRITE BEAD | | L16 |
| 456 | 1206 SMT CAP NPO 50 V | 22 pF | C67 |
| 458 | 1206 SMT CAP NPO 50 V | 22 pF | C72 |

TABLE B-continued

| DRAWING REF. # | DESCRIPTION | PART # OR VALUE | REF. # |
|---|---|---|---|
| 460 | 1206 SMT CAP NPO 50 V | 22 pF | C21 |
| 462 | 1206 SMT RESISTOR | 100 | R14 |
| 464 | 1206 SMT CAP NPO 50 V | 0.5 pF | C18 |
| 466 | 1206 SMT CAP NPO 50 V | 1 pF | C73 |
| 468 | SURF MOUNT COIL | 10 NH | L7 |
| 470 | 1206 SMT RESISTOR | 220 | R15 |
| 472 | 1206 SMT CAP NPO 50 V | 22 pF | C19 |
| 474 | 1206 SMT CAP NPO 50 V | 22 pF | C20 |
| 476 | SURF MOUNT COIL | 22 NH | L13 |
| 478 | DUAL GATE MOSFET | NE25139 | Q9 |
| 480 | DUAL GATE MOSFET | 3SK177 | Q5 |
| 482 | 1206 SMT CAP NPO 50 V | 2.2 pF | C22 |
| 484 | SURF MOUNT COIL | 22 NH | L14 |
| 486 | 1206 SMT CAP Z5U 50 V | 0.2 uF | C70 |
| 488 | 1206 SMT CAP NPO 50 V | 22 pF | C69 |
| 490 | 1206 SMT RESISTOR | 330 | R48 |
| 492 | 1206 SMT RESISTOR | 10K | R54 |
| 494 | 1206 SMT RESISTOR | .02 uF | R49 |
| 496 | 1206 SMT CAP Z5U 50 V | .0022 uF | C46 |
| 498 | 1206 SMT CAP Z5U 50 V | .02 uF | C71 |
| 500 | 1206 SMT CAP NPO 50 V | 22 pF | C83 |
| 502 | SIGNAL DIODE | 1N914 | D1 |
| 504 | SIGNAL DIODE | 1N914 | D2 |
| 506 | POWER TRANSFORMER | | T1 |
| 508 | 1206 SMT CAP NPO 50 V | 47 pF | C23 |
| 510 | N CH FET SOT 23 | MMBFJ310 | Q6 |
| 512 | 1206 SMT RESISTOR | 330 | R29 |
| 514 | 1206 SMT CAP Z5U 50 V | .02 uF | C45 |
| 516 | 1206 SMT RESISTOR | 180 | R30 |
| 518 | RF TRANSFORMER | | T3 |
| 519 | IF OUTPUT | | |
| 520 | 5% 50 V | 47 pF | C47 |
| 522 | 1206 SMT RESISTOR | 10K | R53 |
| 524 | 1206 SMT CAP Z5U 50 V | .02 uF | C24 |
| 526 | 1206 SMT CAP NPO 50 V | 22 pF | C29 |
| 528 | 1206 SMT RESISTOR | 100 | R55 |
| 530 | SURF MOUNT COIL | 10 nH | L11 |
| 532 | 1206 SMT CAP NPO 50 V | 22 pF | C28 |
| 534 | 1206 SMT RESISTOR | 10K | R16 |
| 536 | 1206 SMT RESISTOR | 47K | R17 |
| 538 | SURF MOUNT COIL | 10 nH | L8 |
| 540 | 1206 SMT RESISTOR | 220 | R18 |
| 542 | 1206 SMT RESISTOR | 22 pF | C30 |
| 544 | 1206 SMT RESISTOR | 22 pF | C26 |
| 546 | .25 W 5% CARBON FILM | 390 | R73 |
| 548 | 1206 SMT CAP NPO 50 V | 10 pF | C94 |
| 550 | .25 W 5% CARBON FILM | 330 | R56 |
| 552 | .25 W 5% CARBON FILM | 100 | R72 |
| 554 | 15 V DC INPUT | | |
| 556 | POS 12 VOLT REGULATOR | 7812 | U3 |
| 558 | Z5U 25 V | .1 uF | C48 |
| 560 | 20% 35 V | 1000 uF | C49 |
| 562 | Z5U 25 V | .1 uF | C50 |
| 563 | Z5U 25 V | .047 | C95 |
| 564 | CERAMIC FILTER | | CF2 |
| 566 | Z5U 25 V | .01 uF | C93 |
| 568 | IF QUADRATURE DEJECTOR | LA1235 | U2 |
| 570 | .25 W 5% CARBON FILM | 330 | R20 |
| 572 | Z5U 25 V | .047 uF | C31 |

TABLE B-continued

| DRAWING REF. # | DESCRIPTION | PART # OR VALUE | REF. # |
|---|---|---|---|
| 574 | Z5U 25 V | .047 uF | C33 |
| 576 | Z5U 25 V | .047 uF | C34 |
| 578 | Z5U 25 V | .047 uF | C76 |
| 580 | SUBMIN PC MOUNT POT | 100K | VR1 |
| 582 | RF CHOKE | 2.2 nH | L9 |
| 584 | Z5U 25 V | .047 | C38 |
| 586 | 20% 25 V | 1 uF | C44 |
| 588 | .25 W 5% CARBON FILM | 68K | R26 |
| 590 | MUTE SWITCH S1 | | S1 |
| 592 | .25 W 5% CARBON FILM | 10K | R25 |
| 594 | 20% 25 V | 2.2 uF | C42 |
| 596 | 20% 25 V | 1 uF | C40 |
| 598 | Z5U 25 V | .047 uF | C35 |
| 600 | .25 W 5% CARBON FILM | 56K | R24 |
| 602 | NPO 50 V | 22 pF | C36 |
| 604 | Z5U 25 V | .02 uF | C39 |
| 606 | .25 W 5% CARBON FILM | 4K7 | R59 |
| 608 | 20% 25 V | 1 uF | C85 |
| 610 | COMPOSITE AUDIO OUTPUT | | |
| 612 | SIGNAL STRENGTH OUTPUT | | |
| 614 | QUADRATURE DETECTOR COIL | 235S01 | T2 |
| 616 | NPO 50 V | 4.7 pF | C82 |
| 618 | .25 W 5% CARBON FILM | 2K2 | R22 |
| 620 | .25 W 5% CARBON FILM | 2K2 | R23 |
| 622 | Z5U 25 V | .047 uF | C37 |
| 624 | 20% 25 V | 220 uF | C43 |
| 626 | 1206 SMT RESISTOR | 7K5 | R28 |
| 628 | AFC SWITCH | | S3 |
| 630 | | | |
| 632 | 20% 25 V | 220 uF | C41 |
| 634 | Z5U 25 V | .047 uF | C75 |
| 636 | DUAL OP AMP | LM1458 | U4B |
| 638 | .25 W 5% CARBON FILM | 10K | R27 |
| 640 | SUBMIN PC MOUNT POT | 10K | VR4 |
| 642 | .25 W 5% CARBON FILM | 100K | R51 |
| 644 | 20% 25 V | 47 uF | C81 |
| 646 | Z5U 25 V | .02 uF | C96 |
| 648 | .25 W 5% CARBON FILM | 220K | R21 |
| 650 | | | |
| 652 | | | |
| 654 | .25 W 5% CARBON FILM | 1K | R50 |
| 656 | DUAL OP AMP | LM1458 | U5A |
| 658 | DUAL OP AMP | LM1458 | U5B |
| 660 | .25 W 5% CARBON FILM | 10K | R38 |
| 662 | .25 W 5% CARBON FILM | 10K | R39 |
| 664 | .25 W 5% CARBON FILM | 470K | R40 |
| 666 | .25 W 5% CARBON FILM | 220K | R46 |
| 668 | .25 W 5% CARBON FILM | 220K | R47 |
| 670 | .25 W 5% CARBON FILM | 1K | R37 |
| 672 | LIGHT EMITTING DIODE GREEN | | LD2 |
| 674 | LIGHT EMITTING DIODE GREEN | | LD3 |
| 676 | NPN TRANSISTOR | 2N3904 | Q7 |
| 678 | .25 W 5% CARBON FILM | 47K | R41 |
| 680 | NPN TRANSISTOR | 2N3904 | Q8 |
| 682 | .25 W 5% CARBON FILM | 47K | R42 |
| 684 | Z5U 25 V | .047 uF | C61 |
| 686 | .25 W 5% CARBON FILM | 1K | R43 |
| 688 | LIGHT EMITTING DIODE GREEN | | LD4 |
| 690 | AFC INPUT | | |
| 692 | 1206 SMT CAP NPO 50 V | 22 pF | C8 |
| 694 | TANTATUM CAP 25 V | 10 uF | C74 |
| 696 | VARACTOR DIODE | BB811 | VD1 |
| 698 | SURF MOUNT COIL | 100 nH | L2 |
| 700 | 1206 SMT CAP NPO 50 V | 0.5 pF | C2 |
| 702 | 1206 SMT CAP NPO 50 V | 1 pF | C79 |
| 704 | CERAMIC TRIM CAP | 3-10 PF | VC1 |
| 706 | COAXIAL CERAMIC RESONATOR | | L5 |
| 708 | NPN TRANSISTOR | NE85633 | Q1 |
| 710 | 1206 SMT CAP NPO 50 V | 0.5 pF | C5 |
| 712 | 1206 SMT CAP NPO 50 V | 1 pF | C16 |
| 714 | 1206 SMT CAP NPO 50 V | 3.3 pF | C60 |
| 716 | 1206 SMT RESISTOR | 220 | R2 |
| 718 | SURF MOUNT COIL | 100 nH | L1 |
| 720 | 1206 SMT CAP NPO 50 V | 22 pF | C78 |
| 722 | SURF MOUNT COIL | 68 nH | L3 |
| 724 | 1206 SMT RESISTOR | 100 | R5 |
| 726 | POS 5 VOLT REG | 7805 | U1 |
| 728 | FERRITE BEAD | | L15 |
| 730 | 1206 SMT CAP Z5U 50 V | .1 uF | C10 |
| 732 | NPO 50 V | .001 uF | C27 |
| 734 | 1206 SMT CAP Z5U 50 V | .1 uF | C9 |
| 736 | 1206 SMT CAP NPO 50 V | 22 pF | C12 |
| 738 | 1206 SMT CAP NPO 50 V | 22 pF | C1 |
| 740 | 1206 SMT CAP Z5U 50 V | .1 uF | C3 |
| 741 | .25 W 5% CARBON FILM | 1K5 | R3 |
| 742 | 1206 SMT RESISTOR | 4K7 | R1 |
| 744 | 1206 SMT RESISTOR | 1K | R4 |
| 746 | Z5U 25V | .01 uF | C4 |
| 748 | 1206 SMT CAP NPO 50 V | 0.5 pF | C14 |
| 750 | SURF MOUNT COIL | 12 nH | L10 |
| 752 | DUAL GATE MOSFET | NE25139 | Q2 |
| 754 | 1206 SMT CAP NPO 50 V | 22 pF | C6 |
| 756 | 1206 SMT RESISTOR | 18K | R6 |
| 758 | 1206 SMT RESISTOR | 10K | R9 |
| 760 | 1206 SMT CAP NPO 50 V | 22 pF | C7 |
| 762 | 1206 SMT RESISTOR | 150 | R7 |
| 764 | SURF MOUNT COIL | 15 nH | L4 |
| 766 | 1206 SMT RESISTOR | 100 | R8 |
| 768 | 1206 SMT CAP NPO 50 V | 22 pF | C80 |
| 770 | 1206 SMT CAP NPO 50 V | 22 pF | C11 |
| 772 | NPN TRANSISTOR | NE85633 | Q3 |
| 774 | 1206 SMT RESISTOR | 100K | R10 |
| 775 | 1206 SMT CAP NPO 50 V | 2 pF | C13 |
| 776 | 1206 SMT CAP NPO 50 V | 22 pF | C15 |
| 778 | 1206 SMT RESISTOR | 270 | R11 |
| 780 | LO OUTPUT | | |
| 782 | 20% 35 V | 2 pF | C17 |
| 784 | .25 W 5% CARBON FILM | 10K | R57 |
| 786 | SUBMIN PC MOUNT POT | 10K | VR5 |
| 788 | DUAL OP AMP | LM1458 | U4A |
| 790 | .25 W 5% CARBON | 47K | R52 |

TABLE B-continued

| DRAWING REF. # | DESCRIPTION | PART # OR VALUE | REF. # |
|---|---|---|---|
| 792 | 5% 50 V FILM | 100 uF | C51 |
| 794 | Z5U 25 V | .1 uF | C58 |
| 796 | MULTIPLEX DECODER | LA3430 | U6 |
| 798 | 5% 50 V | .047 uF | C65 |
| 799 | .25 W 5% CARBON FILM | 47K | R58 |
| 800 | .25 W 5% CARBON FILM | 2K2 | R45 |
| 802 | SUBMIN PC MOUNT POT | 1K | VR3 |
| 804 | 20% 25 V | 10 uF | C63 |
| 806 | .25 W 5% CARBON FILM | 20K | R44 |
| 808 | 5% 50 V | .0033 uF | C64 |
| 810 | 5% 50 V | .0033 uF | C84 |
| 812 | SUBMIN PC MOUNT POT | 100K | VR2 |
| 814 | 5% 50 V | .022 uF | C62 |
| 816 | CERAMIC RESONATOR | CSB600J | CF1 |
| 818 | BLEND SWITCH | | S2 |
| 820 | 20% 25 V | 1 uF | C53 |
| 822 | .25 W 5% CARBON FILM | 1K | R35 |
| 824 | LIGHT EMITTING DIODE RED | | LD1 |
| 826 | 5% 50 V | .22 uF | C59 |
| 828 | .25 W 5% CARBON FIM | 4K7 | R34 |
| 830 | 20% 25 V | 1 uF | C57 |
| 832 | 5% 50 V | .01 uF | C77 |
| 834 | .25 W 5% CARBON FILM | 3K3 | R33 |
| 836 | 5% 50 V | .015 uF | C55 |
| 838 | DE-EMPHASIS SWITCH | | S4 |
| 840 | .25 W 5% CARBON FILM | 3K3 | R32 |
| 842 | 5% 50 V | .015 uF | C52 |
| 844 | 20% 25 V | 10 uF | C56 |
| 846 | .25 W 5% CARBON FILM | 10K | R31 + R36 |
| 848 | 21 MHZ LPF | PFB-2 | L18 + L19 |
| 852 | QUAD OP AMP | LM1458 | U7A + U7B |
| 854 | 20% 25 V | 10 uF | C88 + C89 |
| 856 | .25 W 5% CARBON FILM | 5K6 | R62 + R63 |
| 858 | .25 W 5% CARBON FILM | 100K | R66 + R67 |
| 860 | .25 W 5% CARBON FILM | 10K | R68 |
| 862 | 20% 25 V | 10 uF | C90 |
| 864 | .25 W 5% CARBON FILM | 10K | R69 |
| 866 | .25 W 5% CARBON FILM | 62K | R65 & R64 |
| 868 | AUDIO OUTPUTS | | J1 + J2 |
| 870 | 20% 25 V | 10 uF | C86 + C87 |
| 872 | .25 W 5% CARBON FILM | 10K | R60 & R61 |
| 874 | Z5U 25 V | .1 uF | C92 |
| 876 | 20% 25 V | 10 uF | C91 |

In a second embodiment of transmitter 10 and receiver 12, transmitter 10 and receiver 12 are modified to eliminate the multiplexing and demultiplexing features of these devices. More specifically, multiplexing and demultiplexing are not required where the transmitter 10 and receiver 12 are used to transmit composite digital signals. A composite digital signal may be produced by a device such as a CD ROM player which provides the multiplexing feature. This digital signal may be provided to a device which includes demultiplexing to convert the composite digital signal to left and right channel digital signals.

Transmitter 10 would be modified by eliminating the left audio input 22 and associated circuits 24, 26 and 28, and time division multiplexor 34. Programmable divider 3 could be eliminated, oscillator 40 would be eliminated. Receiver 12 would be modified by eliminating stereo decoder 116 and the provision of signal strength level signal from limiting amplifier and quadrature detecting circuit 94. Additionally, circuits 118, and pilot filter 120 and output buffer 122 for one channel would be eliminated.

Of course, further modifications to transmitter 10 and receiver 12 could be made to improve the transmission of digital signals from transmitter 10 to receiver 12 as deemed necessary for the particular application.

It will be understood that the above description is of the preferred exemplary embodiment of the invention, and that the invention is not limited to the specific form shown. For example, as previously discussed, the above-described transmitter and receiver may be modified for use in transmitting digital signals which are audio signals or digital data signals for other systems such as computer systems. Furthermore, it is contemplated that portions of the circuitry may eventually be replaced with microprocessor based signal conditioning circuits having the appropriate analog-to-digital and digital-to-analog conversions when such circuits are developed to operate at the frequencies required to implement the transmitter and receiver arrangement of the present invention. Various other substitutions, modifications, changes and omissions may be made in the design and arrangement of the elements without departing from the spirit of the invention as expressed in the appended claims.

We claim:

1. A system for the wireless transmitting over the air of at least two transmitted signals carried by radio waves the system comprising:
   a transmitter including;
      multiplexing means for multiplexing first and second input signals to produce a multiplexed signal,
      first local oscillator means comprising:
         a ground;
         a varactor including a cathode and an anode wherein said anode is coupled to said ground;
         a first ceramic resonator coupled to said ground, said resonator producing a carrier signal of a predetermined carrier frequency of at least 900 MHz determined by the first ceramic resonator;
         a first capacitor coupled between said resonator and said cathode of said varactor;
         a second capacitor connected in series with a third capacitor, said second and third capacitors coupled between said ground and a junction between said first capacitor and said resonator, said third capacitor being an adjustable capacitor;
         a common base Colpitts oscillator having a transistor including a base, a collector, and an emitter, wherein said base is coupled to said ground by a fourth capacitor;
         a fifth capacitor coupled between said junction and said collector;
         a sixth capacitor coupled between said collector and the emitter of said transistor;

a voltage source coupled to said collector and to said base;

a first filtering circuit coupled between said emitter and said ground; and a second filtering circuit coupled between said base and said ground, modulation means for frequency modulating the carrier signal based upon the multiplexed signal to produce a first electric signal, radiation means for radiating over the air without the use of wires said radio waves carrying said transmitted signals in response to said first electric signal, said radio waves having a frequency of at least 900 MHz, said radiation means comprising a first antenna, first high impedance buffering means coupled between said first local oscillator means and said first antenna so that said first antenna is prevented from modulating the frequency of said first local oscillator means, said buffering means comprising:

a dual gate gallium arsenide metal oxide semiconductor field effect transistor, having dual gates, said field effect transistor having a drain and a source, wherein said drain is coupled to said first antenna;

an impedance matching network comprising a capacitor and an inductor coupled between said first local oscillator means and one of said dual gates;

said voltage source coupled to the other of said dual gates; and said source being coupled to ground through a resistor and a capacitor network; and a receiver including;

converting means for wireless receiving through the air of said radio waves carrying said transmitted signals and for converting said radio waves to a second electric signal, said converting means comprising a second antenna, second local oscillator means comprising:

a ground;

a varactor including a cathode and an anode where the anode is coupled to the ground;

a second ceramic resonator coupled to said ground, said second ceramic resonator disposed to produce a local signal having a local frequency offset from the carrier frequency and determined by the second ceramic resonator;

a first capacitor coupled between said resonator and said cathode of said varactor;

a second capacitor connected in series with a third capacitor, said second and third capacitors coupled between said ground and a junction between said first capacitor and said resonator, said third capacitor being an adjustable capacitor;

a common base Colpitts oscillator having a transistor including a base, a collector, and an emitter, wherein said base is coupled to said ground by a fourth capacitor;

a fifth capacitor coupled between said junction and said collector;

a sixth capacitor coupled between said collector and the emitter of said transistor; a voltage source coupled to said collector and to said base;

a first filtering circuit coupled between said emitter and said ground; and a second filtering circuit coupled between said base and said ground, mixing means for mixing a local signal, having a local frequency, with the second electric signal to lower the frequency of the carrier signal from the second electric signal to produce a third electric signal, where the local frequency is offset from the carrier frequency and is determined by the second ceramic resonator, demodulation means for demodulating the third electric signal to produce a fourth electric signal, and demultiplexing means for demultiplexing the fourth electric signal to produce fifth and sixth electric signals representative of the first and second input signals.

2. The system of claim 1, wherein the transmitted signals are digital signals.

3. The system of claim 1, wherein the transmitted signals are analog signals.

4. The system of claim 1, further comprising means for correcting the local frequency such that the local frequency is maintained offset from the carrier frequency by a predetermined offset frequency.

5. The system of claim 1 further comprising second high impedance buffering means, coupled between said second local oscillator means and said second antenna so that said second antenna is prevented from modulating the frequency of said second local oscillator, said buffering means comprising:

a dual gate gallium arsenide metal oxide semiconductor field effect transistor, having dual gates;

said field effect transistor having a drain and a source, wherein said drain is coupled to said second antenna;

a bandpass filtering network comprising a capacitor and an inductor coupled between said local oscillator and one of said dual gates;

a voltage source coupled to the other of said dual gates; and said source being coupled to ground through a resistor and a capacitor network.

6. The system of claim 1, wherein said transmitter additionally comprises output bandpass filtering means coupled to said radiation means.

7. In a system for the wireless transmitting of at least two transmitted signals carried by radio waves over the air, a transmitter comprising:

multiplexing means for multiplexing first and second input signals to produce a multiplexed signal;

local oscillator means comprising:

a ground;

a varactor including a cathode and an anode where said anode is coupled to said ground;

a ceramic resonator coupled to said ground, said resonator producing a carrier signal of a predetermined carrier frequency of at least 900 MHz determined by the ceramic resonator;

a first capacitor coupled between said resonator and said cathode of said varactor;

a second capacitor connected in series with a third capacitor, said second and third capacitors coupled between said ground and a junction between said first capacitor and said resonator, said third capacitor being an adjustable capacitor;

a common base Colpitts oscillator having a transistor including a base, a collector, and an emitter, wherein said base is coupled to said ground by a fourth capacitor;

a fifth capacitor coupled between said junction and said collector;

a sixth capacitor coupled between said collector and the emitter of said transistor;

a voltage source coupled to said collector and to said base;

a first filtering circuit coupled between said emitter and said ground; and a second filtering circuit coupled between said base and said ground, modulation means for frequency modulating the carrier signal based upon the multiplexed signal to produce a first electric signal;

radiation means for radiating over the air without the use of wires said radio waves carrying said transmitted signals in response to said first electric signal, said radio waves having a frequency of at least 900 MHz, said radiation means comprising an antenna; and high impedance buffering means coupled between said local oscillator means and said antenna so that said antenna is prevented from modulating the frequency of said local oscillator means, said buffering means comprising:

a dual gate gallium arsenide metal oxide semiconductor field effect transistor, having dual gates said field effect transistor having a drain and a source, wherein said drain is coupled to said antenna;

an impedance matching network comprising a capacitor and an inductor coupled between said local oscillator means and one of said dual gates;

said voltage source coupled to the other of said dual gates; and said source between coupled to ground through a resistor and a capacitor network.

8. The transmitter of claim 7, wherein the transmitted signals are digital signals.

9. The transmitter of claim 7, wherein the transmitted signals are analog signals.

10. The system of claim 7, wherein said transmitter additionally comprises output bandpass filtering means coupled to said radiation means.

11. In a system for the wireless transmitting of at least two transmitted signals carried by radio waves over the air, a receiver comprising:

converting means for wireless receiving through the air of said radio waves, carrying said transmitted signals and for converting said radio waves, having a predetermined carrier frequency of at least 900 MHz, to a first electric signal including a carrier signal component, said converting means comprising an antenna;

local oscillator means comprising:

a ground;

a varactor including a cathode and an anode where the anode is coupled to the ground;

a ceramic resonator coupled to said ground, said resonator disposed to produce a local signal having a local frequency offset from the carrier frequency and determined by said resonator;

a first capacitor coupled between said resonator and said cathode of said varactor;

a second capacitor connected in series with a third capacitor, said second and third capacitors coupled between said ground and a junction between said first capacitor and said resonator, said third capacitor being an adjustable capacitor;

a common base Colpitts oscillator having a transistor including a base, a collector, and an emitter, wherein said base is coupled to said ground by a fourth capacitor;

a fifth capacitor coupled between said junction and said collector;

a sixth capacitor coupled between said collector and the emitter of said transistor;

a voltage source coupled to said collector and to said base;

a first filtering circuit coupled between said emitter and said ground; and a second filtering circuit coupled between said base and said ground;

mixing means for mixing a local signal having a local frequency with the first electric signal to lower the frequency of the carrier signal component from the first electric signal to produce a second electric signal, where the local frequency is offset from the carrier frequency and is determined by the ceramic resonator;

demodulation means for demodulating the second electric signal to produce a third electric signal, the multiplexed signal;

demultiplexing means for demultiplexing the third electric signal to produce fourth and fifth electric signals representative of the first and second input signals; and high impedance buffering means coupled between said local oscillator means and said antenna so that said antenna is prevented from modulating the frequency of said local oscillator means said buffering means comprising:

a dual gate gallium arsenide metal oxide semiconductor field effect transistor, having dual gates said field effect transistor having a drain and a source, wherein said drain is coupled to said antenna;

a bandpass filtering network comprising a capacitor and an inductor coupled between said local oscillator and one of said dual gates;

a voltage source coupled to the other of said dual gates; and said source being coupled to ground through a resistor and a capacitor network.

12. The receiver of claim 11, wherein the transmitted signals are digital signals.

13. The receiver of claim 11, wherein the transmitted signals are analog signals.

14. The receiver of claim 11, further comprising means for correcting the local frequency such that the local frequency is maintained offset from the carrier frequency by a predetermined offset frequency.

15. A system for the wireless transmitting over the air of first and second channel stereophonic signals carried by radio waves the system comprising:

a transmitter including;

a multiplexer disposed to multiplex first and second channel stereophonic signals to produce a composite signal, a first local oscillator comprising:

a ground;

a varactor including a cathode and an anode where said anode is coupled to said ground;

a first ceramic resonator coupled to said ground, said resonator disposed to produce a carrier signal of a predetermined carrier frequency of at least 900 MHz determined by the first ceramic resonator;

a first capacitor coupled between said resonator and said cathode of said varactor;

a second capacitor connected in series with a third capacitor, said second and third capacitors coupled between said ground and a junction between said first capacitor and said resonator, said third capacitor being an adjustable capacitor;

a common base Colpitts oscillator having a transistor including a base, a collector, and an emitter, wherein said base is coupled to said ground by a fourth capacitor;

a fifth capacitor coupled between said junction and said collector;

a sixth capacitor coupled between said collector and the emitter of said transistor;

a voltage source coupled to said collector and to said base;

a first filtering circuit coupled between said emitter and said ground; and a second filtering circuit coupled between said base and said ground, modulation means for frequency modulating the carrier signal based upon the composite signal to produce a first electric signal, a first antenna coupled to said modulating means to radiate over the air without the use of wires said radio waves carrying said first and second channel stereophonic signals in response to said first electric signal, said radio waves having a frequency of at least 900 MHz, a first high impedance buffering circuit coupled between said first antenna and said first local oscillator, so that said first antenna is prevented from modulating the frequency of said first local oscillator, said buffering circuit comprising:

a dual gate gallium arsenide metal oxide semiconductor field effect transistor, having dual gates.

said field effect transistor having a drain and a source, wherein said drain is coupled to said first antenna;

an impedance matching network comprising a capacitor and an inductor coupled between said first local oscillator and one of said duel gates;

said voltage source coupled to the other of said dual gates; and said source being coupled to ground through a resistor and a capacitor network; and a receiver including;

a second antenna arranged to wirelessly receive through the air said radio waves carrying said first and second channel stereophonic signals and to convert said radio waves to a second electric signal, a second local oscillator comprising;

a ground;

a varactor including a cathode and an anode where the anode is coupled to the ground;

a second ceramic resonator coupled to said ground, said resonator disposed to produce a local signal having a local frequency offset from the carrier frequency and determined by the second ceramic resonator;

a first capacitor coupled between said resonator and said cathode of said varactor;

a second capacitor connected in series with a third capacitor, said second and third capacitors coupled between said ground and a junction between said first capacitor and said resonator, said third capacitor being an adjustable capacitor;

a common base Colpitts oscillator having a transistor including a base, a collector, and an emitter, wherein said base is coupled to said ground by a fourth capacitor;

a fifth capacitor coupled between said junction and said collector;

a sixth capacitor coupled between said collector and the emitter of said transistor;

a voltage source coupled to said collector and said base;

a first filtering circuit coupled between said emitter and said ground; and a second filtering circuit coupled between said base and said ground, a mixer coupled to the second antenna and the second local oscillator to lower the frequency of the carrier signal from the second electric signal to produce a third electric signal, a demodulator coupled to the mixer to demodulated the third electric signal to produce a fourth signal representative of the multiplexed signal, a demultiplexer coupled to the demodulator to demultiplex the fourth electric signal to produce fifth and sixth electric signals representative of the first and second channel stereophonic signals, respectively.

16. The system of claim 15, further comprising an automatic frequency control circuit coupled to the local oscillator and the demodulator to correct the local frequency such that the local frequency is maintained offset from the carrier frequency by a predetermined offset frequency.

17. The system of claim 15, further comprising a second high impedance buffering circuit coupled between said second local oscillator and said second antenna, so that said second antenna is prevented from modulating the frequency of said second local oscillator, said buffering circuit comprising;

a dual gate gallium arsenide metal oxide semiconductor field effect transistor, having dual gates;

said field effect transistor having a drain and a source, wherein said drain is coupled to said second antenna;

a bandpass filtering network comprising a capacitor and an inductor coupled between said second local oscillator and one of said dual gates;

said voltage source coupled to the other of said dual gates; and said source being coupled to ground through a resistor and a capacitor network.

18. The system of claim 15, wherein said transmitter additionally comprises output bandpass filtering means coupled to said first antenna.

19. In a system for the wireless transmitting of first and second channel stereophonic signals carried by radio waves over the air, a transmitter comprising:

a multiplexer disposed to multiplex the first and second channel stereophonic signals to produce a composite signal;

a local oscillator comprising:
- a ground;
- a varactor including a cathode and an anode where said anode is coupled to said ground;
- a ceramic resonator coupled to said ground, said resonator disposed to produce a carrier signal of a predetermined carrier frequency of at least 900 MHz determined by the ceramic resonator;
- a first capacitor coupled between said resonator and said cathode of said varactor;
- a second capacitor connected in series with a third capacitor, said second and third capacitors coupled between said ground and a junction between said first capacitor and said resonator, said third capacitor being an adjustable capacitor;
- a common base Colpitts oscillator having a transistor including a base, a collector, and an emitter, wherein said base is coupled to said ground by a fourth capacitor;
- a fifth capacitor coupled between said junction and said collector;
- a sixth capacitor coupled between said collector and the emitter of said transistor;
- a voltage source coupled to said collector and to said base;
- a first filtering circuit coupled between said emitter and said ground; and
- a second filtering circuit coupled between said base and said ground, modulation means for frequency modulating the carrier signal based upon the composite signal to produce an electric signal, an antenna coupled to said modulating means for radiating over the air without the use of wires said radio waves carrying said first and second channel stereophonic signals in response to said electric signal, said radio waves having a frequency of at least 900 MHz; and a high impedance buffering circuit coupled between the antenna and said local oscillator, so that said antenna is prevented from modulating the frequency of said local oscillator, said buffering circuit comprising;
- a dual gate gallium arsenide metal oxide semiconductor field effect transistor, having dual gates
- said field effect transistor having a drain and a source, wherein said drain is coupled to said antenna;
- an impedance matching network comprising a capacitor and an inductor coupled between said local oscillator and one of said dual gates; p2 said voltage source coupled to the other of said dual gates; and
- said source being coupled to ground through a resistor and a capacitor network.

20. They system of claim 19, wherein said transmitter additionally comprises output bandpass filtering means coupled to said antenna.

21. In a system for the wireless transmitting of first and second channel stereophonic signals carried by radio waves over the air, a receiver comprising:

an antenna arranged to wirelessly receive through the air said radio waves carrying said first and second channel stereophonic signals and to convert said radio waves, having a predetermined carrier frequency of at least 900 MHz, to a first electric signal including a carrier signal component, a local oscillator comprising:
- a ground;
- a varactor including a cathode and an anode where the anode is coupled to the ground;
- a ceramic resonator coupled to said ground, said resonator disposed to produce a local frequency offset from the carrier frequency and determined by the ceramic resonator;
- a first capacitor coupled between said resonator and said cathode of said varactor;
- a second capacitor connected in series with a third capacitor, said second and third capacitors coupled between said ground and a junction between said first capacitor and said resonator, said third capacitor being an adjustable capacitor;
- a common base Colpitts oscillator having a transistor including a base, a collector, and an emitter, wherein said base is coupled to said ground by a fourth capacitor;
- a fifth capacitor coupled between said junction and said collector;
- a sixth capacitor coupled between said collector and the emitter of said transistor;
- a voltage source coupled to said collector and to said base;
- a first filtering circuit coupled between said emitter and said ground; and
- a second filtering circuit coupled between said base and said ground;

a mixer coupled to the antenna and the local oscillator to lower the frequency of the carrier signal component from the second electric signal to produce a second signal;

a demodulator coupled to the mixer to demodulate the second electric signal to produce a third electric signal representative of the composite signal;

a demultiplexer coupled to the demodulator to demultiplex the third electric signal to produce fourth and fifth electric signals representative of the first and second channel stereophonic signals, respectively; and a high impedance buffering circuit coupled between the local oscillator and the antenna, so that said antenna is prevented from modulating the frequency of said local oscillator, said buffering circuit comprising;
- a dual gate gallium arsenide metal oxide semiconductor field effect transistor having dual gates;
- said field effect transistor having a drain and a source, wherein said drain is coupled to said antenna;
- a bandpass filtering network comprising a capacitor and an inductor coupled between said local oscillator and one of said dual gates;
- a voltage source coupled to the other of said dual gates; and
- said source being coupled to ground through a resistor and a capacitor network.

22. The receiver of claim 21, further comprising an automatic frequency control circuit coupled to the local oscillator and the demodulator to correct the local frequency such that the local frequency is maintained offset from the carrier frequency by a predetermined offset frequency.

23. A system for the wireless transmitting of a digital signal carried by a radio waves, over the air, the system comprising:
- a transmitter including;
  - a first local oscillator comprising:
    - a ground;
    - a first ceramic resonator coupled to said ground, said resonator disposed to produce a carrier signal of a predetermined carrier frequency of at least 900 MHz determined by a first ceramic resonator;
    - a varactor including a cathode and an anode where said anode is coupled to said ground, said varactor modulates the carrier signal based upon the digital signal to produce a first electric signal;
    - a first capacitor coupled between said resonator and said cathode of said varactor;
    - a second capacitor connected in series with a third capacitor, said second and third capacitors coupled between said ground and a junction between said first capacitor and said resonator, said third capacitor being an adjustable capacitor;
    - a common base Colpitts oscillator having a transistor including a base, a collector, and an emitter, wherein said base is coupled to said ground by a fourth capacitor;
    - a fifth capacitor coupled between said junction and said collector;
    - a sixth capacitor coupled between said collector and the emitter of said transistor;
    - a voltage source coupled to said collector and to said base;
    - a first filtering circuit coupled between said emitter and said ground; and
    - a second filtering circuit coupled between said base and said ground,
  - a first antenna coupled to the first local oscillator to radiate over the air without the use of wires said radio waves carrying said digital signal in response to said first electric signal, said radio waves having a frequency of at least 900 MHz,
  - a high impedance buffering circuit coupled between the first local oscillator and the first antenna, so that said first antenna is prevented from modulating the frequency of said first local oscillator, said buffering circuit comprising;
    - a dual gate gallium arsenide metal oxide semiconductor field effect transistor, having dual gates
    - said field effect transistor having a drain and a source, wherein said drain is coupled to said first antenna;
    - an impedance matching network comprising a capacitor and an inductor coupled between said first local oscillator and one of said dual gates; and
    - said voltage source coupled to the other of said dual gates; and
- a receiver including;
  - a second antenna arranged to wirelessly receive through the air said radio waves carrying said digital signal and to convert said radio waves, having a predetermined carrier frequency of at least 900 MHz, to a second electric signal,
  - a second local oscillator comprising:
    - a ground;
    - a second ceramic resonator coupled to said ground, said resonator disposed to produce a local frequency offset from the carrier frequency and determined by the second ceramic resonator;
    - a second varactor including a cathode and an anode where the anode is coupled to the ground, said varactor controls the local signal;
    - a first capacitor coupled between said resonator and said cathode of said varactor;
    - a second capacitor connected in series with a third capacitor, said second and third capacitors coupled between said ground and a junction between said first capacitor and said resonator, said third capacitor being an adjustable capacitor;
    - a common base Colpitts oscillator having a transistor including a base, a collector, and an emitter, wherein said base is coupled to said ground by a fourth capacitor;
    - a fifth capacitor coupled between said junction and said collector;
    - a sixth capacitor coupled between said collector and the emitter of said transistor;
    - a voltage source coupled to said collector and to said base;
    - a first filtering circuit coupled between said emitter and said ground; and
    - a second filtering circuit coupled between said base and said ground,
  - a mixer coupled to the second antenna and the local oscillator to lower the frequency of the carrier signal from the second electric signal to produce a third electric signal,
  - a demodulator coupled to the mixer to remove the carrier signal from the third electric signal to produce a fourth electric signal.

24. The system of claim 23, further comprising an automatic frequency control circuit coupled to the second local oscillator and the demodulator to correct the local frequency such that the local frequency is maintained offset from the carrier frequency by a predetermined offset frequency.

25. The system of claim 23, further comprising a high impedance buffering circuit coupled between said second local oscillator and said second antenna, so that said second antenna is prevented from modulating the frequency of said second local oscillator, said buffering circuit comprising;
- a dual gate gallium arsenide metal oxide semiconductor field effect transistor, having dual gates;
- said field effect transistor having a drain and a source, wherein said drain is coupled to said second antenna;
- a bandpass filtering network comprising a capacitor and an inductor coupled between said second local oscillator and one of said dual gates;
- said voltage source coupled to the other of said dual gates; and
- said source being coupled to ground through a resistor and a capacitor network.

26. The system of claim 23, wherein said transmitter additionally comprises output bandpass filtering means coupled to said first antenna.

* * * * *